(12) United States Patent
Hori

(10) Patent No.: US 7,454,281 B2
(45) Date of Patent: Nov. 18, 2008

(54) FAULT DIAGNOSIS APPARATUS FOR SENSORS USED IN A SYSTEM

(75) Inventor: Toshio Hori, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/453,214

(22) Filed: Jun. 15, 2006

(65) Prior Publication Data

US 2006/0287806 A1 Dec. 21, 2006

(30) Foreign Application Priority Data

Jun. 16, 2005 (JP) ............................. 2005-176407

(51) Int. Cl.
*G06F 19/00* (2006.01)
*G01L 3/26* (2006.01)

(52) U.S. Cl. ........................ 701/101; 73/116
(58) Field of Classification Search ................ 701/101, 701/102, 103, 104; 73/116, 117.2, 117.3, 73/118.1

See application file for complete search history.

(56) References Cited

U.S. PATENT DOCUMENTS

| 5,903,159 | A | * | 5/1999 | Miyata et al. ............... 324/536 |
| 6,427,527 | B1 | | 8/2002 | Langer |
| 6,656,119 | B2 | * | 12/2003 | Sasaki et al. ................ 600/437 |
| 7,077,231 | B2 | * | 7/2006 | Midorikawa ................ 180/268 |
| 2002/0138801 | A1 | * | 9/2002 | Wang et al. .................. 714/729 |
| 2003/0139860 | A1 | | 7/2003 | McBrien et al. |

FOREIGN PATENT DOCUMENTS

JP 5-37428 A 2/1993

* cited by examiner

*Primary Examiner*—John T Kwon
(74) *Attorney, Agent, or Firm*—Crowell & Moring LLP

(57) ABSTRACT

A fault diagnosis apparatus for sensors in an apparatus system has at least three sensors which detect different physical quantities for one physical phenomenon which vary in correlation with one another, the sensors outputting signals indicating the detected physical quantities, wherein outputs from the at least three sensors are converted into one identical physical quantity in accordance with the correlations so that the resulting identical physical quantity can be used to determine whether or not each of the sensors is defective.

8 Claims, 12 Drawing Sheets

FAULT DIAGNOSIS APPARATUS FOR SENSORS USED IN A SYSTEM

BACKGROUND OF THE INVENTION

The present invention relates to a fault diagnosis apparatus for sensors in an electric system having three or more sensors, and in particular, to a fault diagnosis apparatus for sensors used in vehicles, power plants, industrial machines, chemical plants and the like.

There has been disclosed condition detection means, that is, a fault diagnosis apparatus for sensors in which a second sensor is provided in addition to a first sensor; the first sensor converts a first physical quantity indicating a behavior (physical phenomenon) of a vehicle into a first measurement signal, and the second sensor converts a second physical quantity indicating a behavior of the vehicle which is different from the first physical quantity into a second measurement signal. Calculation means calculates an approximate value corresponding to the first physical quantity on the basis of the second measurement signal. The calculation means then compares a measurement from the first sensor with the approximate value based on the second measurement signal to determine whether or not the first sensor is faulty (for example, JP-A-5-37428).

This fault diagnosis apparatus is incorporated into a vehicle multiple-transmission apparatus comprising a sensor node that transmits the measurement of the first physical quantity as communication data, on the basis of the first measurement signal.

SUMMARY OF THE INVENTION

With reference to FIG. 20, explanation will be given of how a sensor determines a fault when a sensor detects a certain physical phenomenon in a machine apparatus. The term "fault" as used herein refers to the state in which the sensor cannot obtain the true value for the physical phenomenon and outputs a physical quantity different from the true value.

In FIG. 20, the machine apparatus for which the physical quantity is measured by the sensor is an internal combustion engine 1000 for a vehicle such as an automobile. When only one sensor such as a sensor 1001 measures a certain physical phenomenon in the engine 1000, for example, the amount of air sucked, no other method is available for recognizing the physical phenomenon in the engine 1000 in order to verify whether or not the sensor 1001 is faulty. Consequently, a fault in the sensor 1001 cannot be detected.

Thus, two sensors such as sensors 1001 and 1002 are set to measure one physical phenomenon in the engine 1000. Values detected by the sensors 1001 and 1002 are compared, and if they are significantly different from each other, it is possible to detect that one of the sensors is faulty.

However, which of the sensors 1001 and 1002 is faulty cannot be determined because no other method is available for recognizing the physical phenomenon in the engine 1000 as is the case in which only one sensor is set. In other words, the faulty sensor cannot be identified.

Thus, three sensors such as sensors 1001, 1002, and 1003 are set, and a comparative determination section 1004 compares detected values X (physical quantities indicative of one phenomenon) from the three sensors with one another. The comparative determination means 1004 thus detects which sensor is faulty on the basis of a significant difference in detected values between one of the sensors and the two others. Fault determination is thus achieved.

The probability of a fault occurring in the sensor is generally low, so that it is possible to assume that the two sensors do not simultaneously become faulty. Consequently, the number of faulty sensors can be limited to one, thus making it possible to detect which sensor is faulty as described above.

Therefore, which sensor is faulty can be detected by using three or more sensors to measure the same physical phenomenon and comparing detected values from the sensors with one another to determine which sensor is faulty, on the basis of a significant difference in detected values between one of the sensors and the two others.

To simply improve the reliability of a system that measures a certain physical phenomenon, the detected values from the sensors 1001, 1002, and 1003 may be simply compared with one another if the sensors conform to the same specifications (that is, they measure the same physical quantity). However, three or more sensors need to be set, resulting in a redundant, expensive system.

The present invention is made in view of the above. An object of the present invention is to provide a fault diagnosis apparatus for sensors in an apparatus system which, when any of a group of target sensors is faulty, can appropriately detect the fault without the need for redundancy or increased costs.

The present invention provides a fault diagnosis apparatus for sensors in an apparatus system having at least three sensors which detect different physical quantities for a physical phenomenon which vary in correlation with one another, the sensors outputting signals indicating the detected physical quantities, the apparatus comprising comparison means for comparing detection outputs from the at least three sensors with one another and determination means for determining whether or not every two comparison results from the comparison means have a difference of at least a predetermined value and comparing a comparison output having a difference of at least the predetermined value with a comparison output not having a difference of at least the predetermined value to determine that one of the sensors is defective.

The present invention provides a fault diagnosis apparatus for sensors in an apparatus system having at least three sensors which detect different physical quantities for a physical phenomenon which vary in correlation with one another, the sensors outputting signals indicating the detected physical quantities, the apparatus comprising comparison means for comparing outputs from each set of two of the at least three sensors with each other and determination means for determining whether or not a difference in output between the two sensors of each set has at least a predetermined value and comparing a set involving a difference of at least the predetermined value with a set not involving a difference of at least the predetermined value to determine that one of the sensors is defective.

In the fault diagnosis apparatus for sensors according to the present invention, the determination means preferably determines that a defect is occurring in one of the sensors which belongs to the set having a difference of at least the predetermined value and which provides an output deviating from the outputs from the other sensors.

In the fault diagnosis apparatus for sensors according to the present invention, the determination means preferably determines that two sensors that do not belong to the set not involving a difference of at least the predetermined value are in a proper condition.

In the fault diagnosis apparatus for sensors according to the present invention, the determination means preferably determines that a defect is occurring in one of the sensors for which the apparatus determines at least twice that the sensor belongs to the set involving a difference of at least the predetermined value.

The present invention provides a fault diagnosis apparatus for sensors in an apparatus system having at least three sensors which detect different physical quantities for one physical phenomenon which vary in correlation with one another, the sensors outputting signals indicating the detected physical quantities, the apparatus comprising determination criterion calculation means for determining a determination criterion value for determining a defect on the basis of outputs from the at least three sensors and comparative determination means for comparing the determination criterion value determined by the determination criterion calculation means with an output from each of the sensors to determine which of the sensors is defective.

In the fault diagnosis apparatus for sensors according to the present invention, the determination criterion calculation means preferably calculates an average value of outputs from the at least three sensors and determines the average value to be the determination criterion value.

The present invention provides a fault diagnosis apparatus for sensors in an apparatus system having at least three sensors which detect different physical quantities for one physical phenomenon which vary in correlation with one another, the sensors outputting signals indicating the detected physical quantities, the apparatus comprising determination criterion calculation means for determining a determination criterion value for determining a defect on the basis of at least two of outputs from the at least three sensors and the other outputs, and comparative determination means for comparing the determination criterion value determined by the determination criterion calculation means with the output from at least one of the sensors to determine whether or not the compared sensor is defective.

In the fault diagnosis apparatus for sensors according to the present invention, the comparative determination means preferably compares an output value obtained from one of the sensors with an average value obtained from the other sensors to determine whether or not the one of the sensors is defective.

The present invention provides a fault diagnosis apparatus for sensors in an apparatus system having at least three sensors which detect different physical quantities for one physical phenomenon which vary in correlation with one another, the sensors outputting signals indicating the detected physical quantities, wherein the apparatus converts outputs from the at least three sensors into one identical physical quantity in accordance with correlations among the sensors and using the resulting identical physical quantity to determine whether or not the sensors are defective.

In the fault diagnosis apparatus for sensors according to the present invention, preferably, if an output from any of the sensors exceeds a predetermined value larger than a predetermined value for fault determination, this sensor is determined to be defective in preference to other fault determinations.

The fault diagnosis apparatus for sensors according to the present invention can determine which of at least three sensors that detect different physical quantities is faulty, without the need to provide multiple sensors that measure the same physical quantity. Thus, when any of the group of target sensors is faulty, the fault can be appropriately determined without the need for redundancy or increased costs.

Other objects, features and advantages of the invention will become apparent from the following description of the embodiments of the invention taken in conjunction with the accompanying drawings.

DESCRIPTION OF THE EMBODIMENTS

First, description will be given of the principle and utility of a fault diagnosis apparatus for sensors according to the present invention.

Control systems for vehicles, power plants, industrial machines, and chemical plants include, for example, sensors that detect the condition of an engine. Many types of sensors that detect various conditions of the engine are provided in these systems to detect different physical conditions. The different physical conditions do not vary completely independently but many of them vary in correlation with one another.

Accordingly, the same physical quantity can be calculated from detected values (outputs) from sensors detecting different physical conditions of an engine. Thus, for sensors that detect three or more different physical quantities for one physical phenomenon, which of these sensors is faulty can be detected on the basis of a significant difference between one of the sensors and others, by comparing detected values.

This will be described with reference to FIG. 1. Three sensors 11, 12, and 13 that directly detect different physical conditions are mounted in an engine 10. Detected quantities (sensor outputs) B, C, and D detected by these sensors 11, 12, and 13 are input to conversion processing sections 21, 22, and 23. As previously described, the different physical conditions of the engine 10 do not vary completely independently but vary in correlation with one another. This enables the same physical quantity A to be calculated from the different detected values. The conversion processing sections 21, 22, and 23 converts the sensor output signals B, C, and D into the physical quantity A (for example, intake air flow, intake pipe pressure, or engine speed) indicating a physical phenomenon for output.

Figure 20:
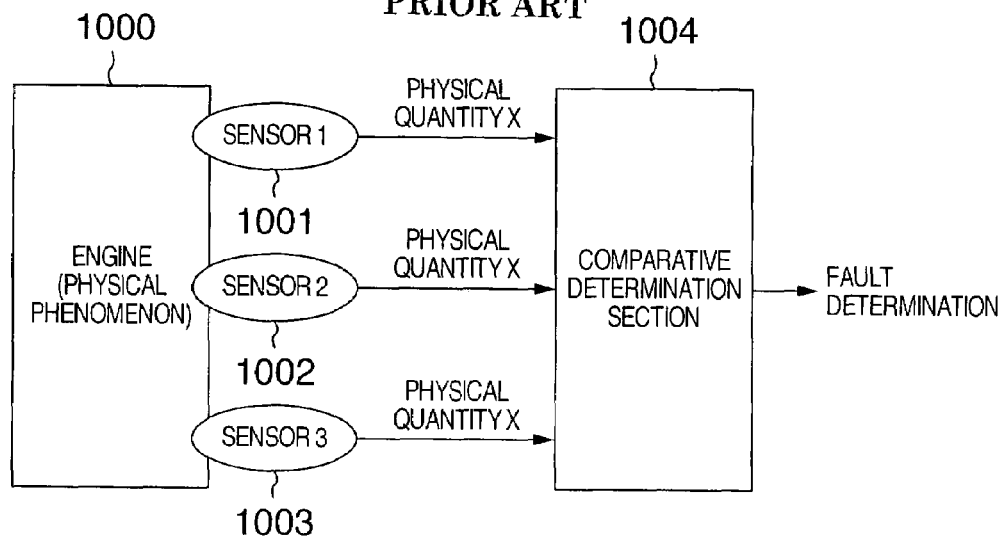
FIG. 20 is a control block diagram showing a conventional example of a fault diagnosis apparatus for sensors.

This enables a comparative determination section 30 to carry out fault determination equivalent to that described with reference to FIG. 20. The comparative determination section 30 can thus determine which of the sensors 11, 12, and 13 that detect different physical quantities without the need to provide multiple sensors that measure the same physical quantity.

Figure 2:
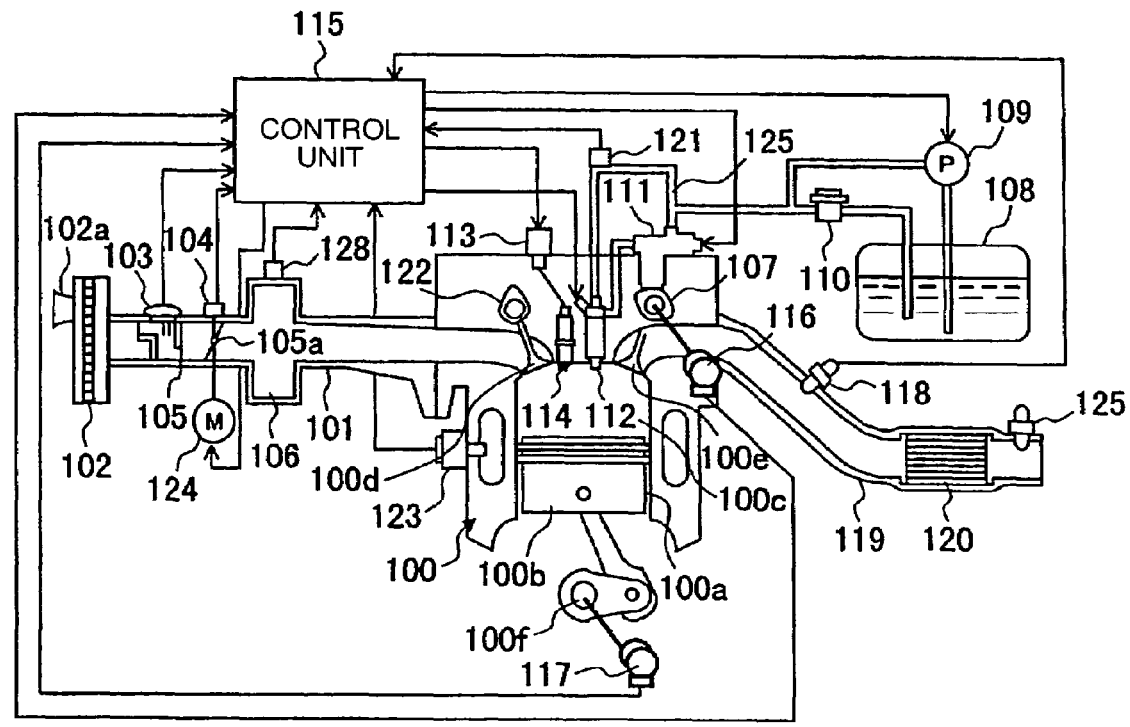
FIG. 2 is a diagram showing the configuration of a cylinder-injection internal combustion engine to which a fault diagnosis apparatus for sensors according to an embodiment of the present invention is applied.

Now, with reference to FIG. 2, description will be given of a cylinder-injection internal combustion engine that is a power plant, as an embodiment of an apparatus system to which the fault diagnosis apparatus for sensors according to the present invention is applied.

The cylinder-injection internal combustion engine (hereinafter referred to as the engine) 100 has a piston 100b in a cylinder bore 100a. A combustion chamber 100c is defined above the piston 100b as shown in FIG. 2.

Intake air introduced into the combustion chamber 100c is taken in from an inlet portion 102a of an air cleaner 102. The intake air passes through an air flow sensor 103 that is means for measuring an operation condition of the engine 100 and through a throttle body 105 accommodating an electric-control throttle valve 105a that controls air flow. The air finally enters a collector 106.

The air flow sensor 103 outputs a detection signal indicating the air flow corresponding to a physical quantity, to a control unit 115 that is an engine control apparatus.

A throttle sensor 104 is mounted in the throttle body 105; the throttle sensor 104 is also means for measuring an operation condition of the engine 100. The throttle sensor 104 outputs a detection signal indicating the opening of the electric-control throttle valve 105a, which corresponds to a physical quantity, to the control unit 115.

The air sucked into the collector 106 is distributed to an intake manifold 101 connected to each combustion chamber 100c of the engine 100, and is then guided to the combustion chamber 100c.

An intake pipe pressure sensor 128 is mounted in the collector 106. The intake pipe pressure sensor 128 detects the pressure in the collector 106, that is, intake pipe pressure, and outputs the resulting detection signal to the control unit 115.

A fuel from a fuel tank 108 such as gasoline is primarily pressurized by a fuel pump 109 and then has its pressure regulated to a specified value by a fuel pressure regulator 110. The fuel is further secondarily pressurized to a higher pressure by a high pressure fuel pump 111 and is then fed to a common rail 125 under pressure.

A fuel pressure sensor 121 is mounted on the common rail 125. The fuel pressure sensor 121 detects the pressure of the secondarily pressurized fuel and outputs the resulting detection signal to the control unit 115.

The high-pressure fuel is directly injected into the combustion chamber 100c from an injector 112 provided for each combustion chamber 100c (cylinder injection). The fuel injected into the combustion chamber 100c is ignited by an ignition plug 114 in response to an ignition signal the voltage of which has been increased by an ignition coil 113.

A cam angle sensor 116 is attached to a cam shaft 107 for an exhaust valve 100e. The cam angle sensor 116 detects the phase of the cam shaft 107, which corresponds to a physical quantity, and outputs the resulting detection signal to the control unit 115. The cam angle sensor 116 may be attached to a cam shaft 122 for an intake valve 100d.

A crank angle sensor 117 is attached to a crank shaft 100f in the engine 100. The crank angle sensor 117 detects the rotation and phase of the crank shaft 100f, which corresponds to a physical quantity, and outputs the resulting detection signal to the control unit 115.

A catalyst 120 is provided in an exhaust pipe 119. An air/fuel ratio sensor 118 is mounted upstream of the catalyst 120 in the exhaust pipe 119. The air/fuel ratio sensor 118 detects the amount of oxygen in an exhaust gas, which corresponds to a physical quantity, and outputs a detection signal representative of the air/fuel ratio to the control unit 115.

Figure 3:
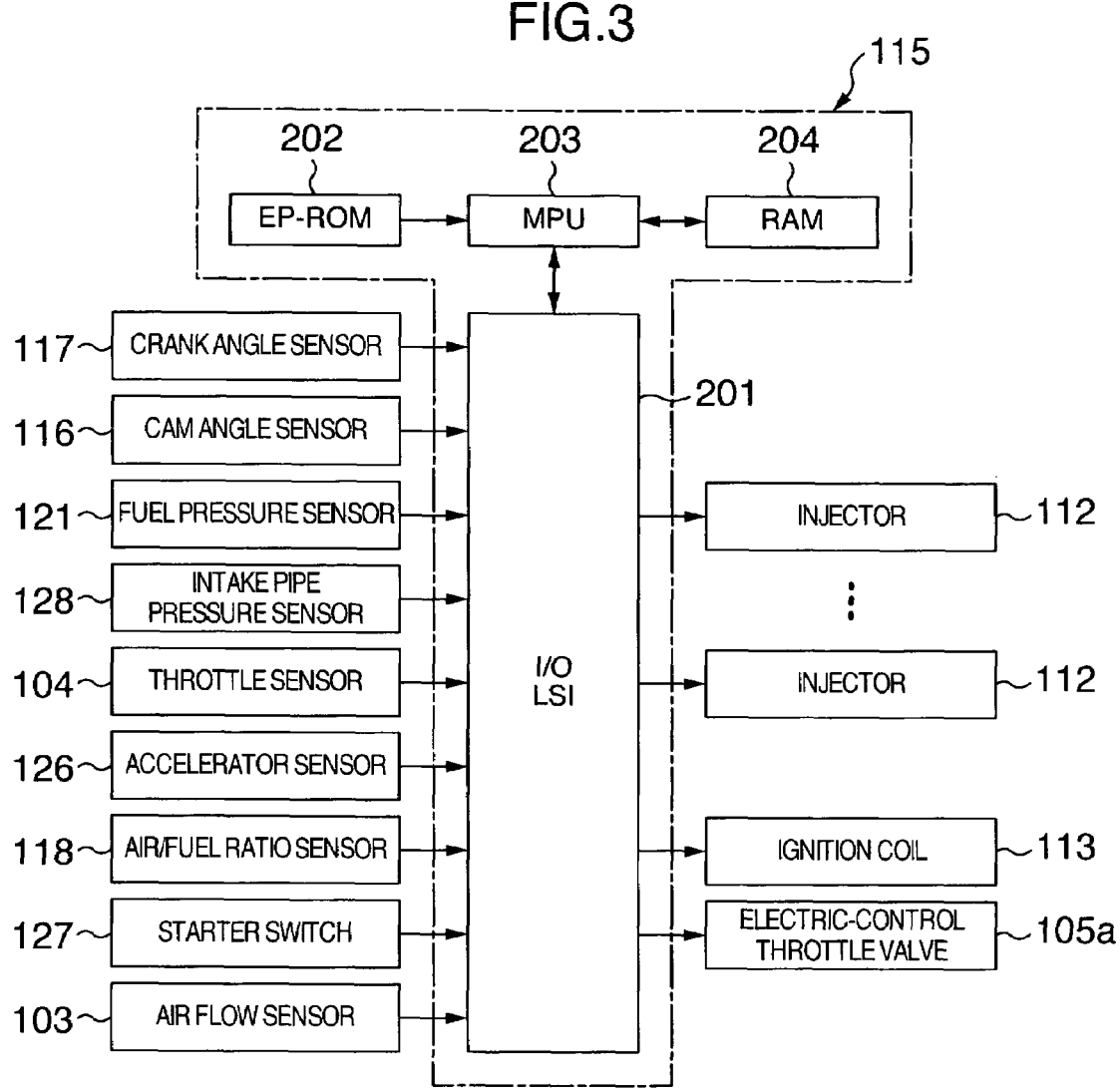
FIG. 3 is a control block diagram showing a control unit used in the cylinder-injection internal combustion engine in FIG. 2.

The control unit 115 is based on a microcomputer and is composed of an MPU 203, a ROM 202, a RAM 204, an I/OLSI 201 including an A/D converter, and the like, as shown in FIG. 3.

The control unit 115 receives the signals from each of the air flow sensor 103, throttle sensor 104, the cam angle sensor 116, the crank angle sensor 117, the air/fuel ratio sensor 118, an accelerator sensor 126, a starter switch 127, and an intake pipe pressure sensor 128; all these sensors are means for measuring (detecting) the operating conditions of the engine. The control unit 115 executes a predetermined calculation process and outputs various control signals resulting from the calculation, to the injector 112, the ignition coil 113, and the like. The control unit 115 thus performs fuel supply control, ignition timing control, and sensor fault determination.

Focus will be given on the intake air quantity of the engine 100, which is a physical phenomenon in this engine control system. This will be described with reference to FIG. 4.

The intake air quantity of the engine 100 is measured by the air flow sensor 103 as previously described. The intake air quantity is controlled by the electric-control throttle valve 105a of the throttle body 105 on the basis of the operator's intention or the like. The throttle body 105 is provided with the throttle sensor 104, which measures the opening of the valve as previously described.

Intake air is sucked into the combustion chamber 100c through a suction stroke of the engine 100. The pressure exerted downstream of the electric-control throttle valve 105a, that is, the pressure in the collector 106, is determined by the balance between the intake air quantity and the force applied by the engine 100 to suck air. The pressure in the collector 106 is measured by the intake pipe pressure sensor 128 as previously described.

These phenomena will be described below in detail.

Figure 5:
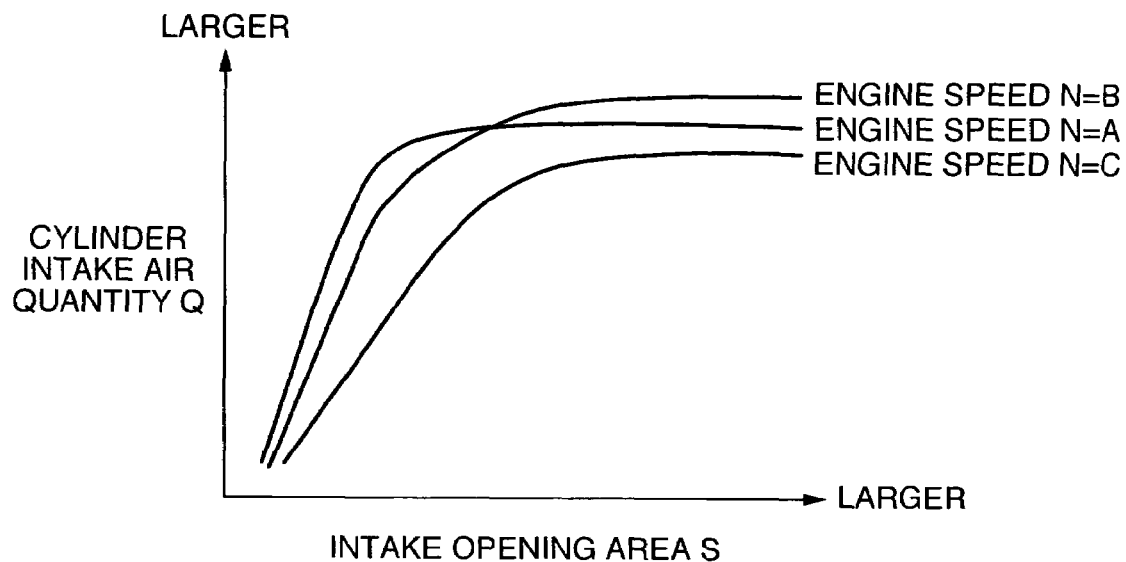
FIG. 5 is a graph showing the relationship between cylinder intake air quantity and intake opening area in engine control.

With reference to FIG. 5, description will be given of the relationship between the intake air quantity Q and the throttle valve opening. Air taken in by the engine 100 is often sucked into the plurality of combustion chambers (cylinders) 100*c* in the engine 100. When the amount of air sucked by one combustion chamber 100*c* during one suction stroke is called the cylinder intake air quantity Q, since the intake air quantity measured by the air flow sensor 103 is the total amount of air taken in by the engine 100 during a predetermined time, the following relation (correlation) is established: the intake air quantity=cylinder intake air quantity Q×the number of suction strokes during the predetermined time.

Intake opening area S is automatically determined by the throttle opening measured by the throttle sensor 104. Once the intake opening area S is determined, a throttle portion of the electric-control throttle valve 105*a* balances the intake air quantity Q with the pressure in the collector 106 on the basis of the balance between the intake air quantity and the force exerted by the engine 100 to take in air. Accordingly, a relationship uniquely determined for each engine rotation speed N is established between the intake opening area S and the cylinder intake air quantity Q, as shown in FIG. 5.

Therefore, the intake air quantity Q can be calculated on the basis of a detected throttle opening and a known engine rotation speed N.

Figure 6:
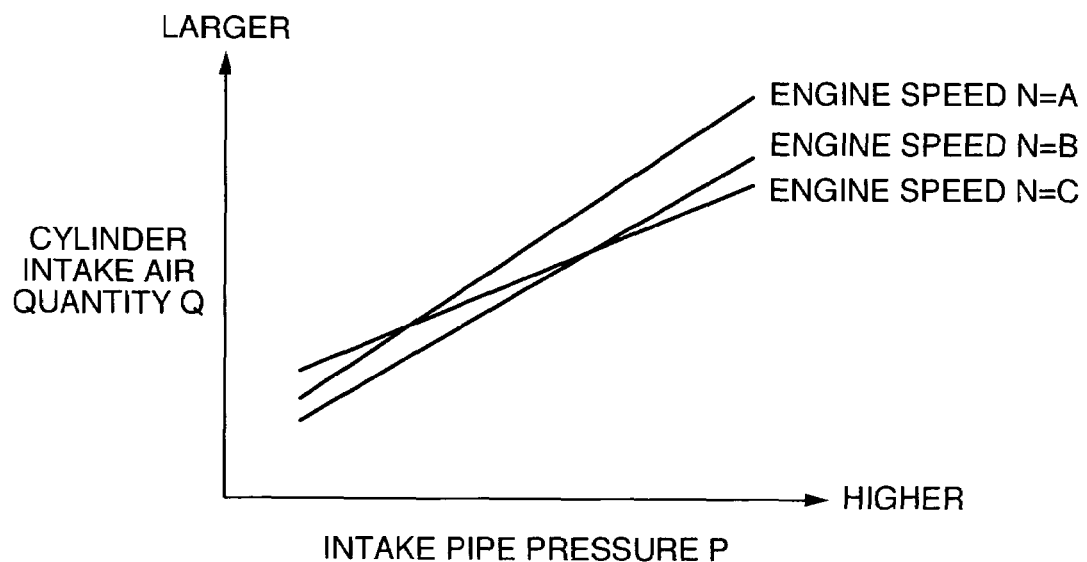
FIG. 6 is a graph showing the relationship between cylinder intake air quantity and intake pipe pressure in engine control.

Now, the relationship between the cylinder intake air quantity Q and the intake pipe pressure P will be described with reference to FIG. 6. As previously described, the pressure in the collector, that is, the intake pipe pressure P, is determined by the balance between the cylinder intake air quantity Q and the force exerted by the engine 100 to take in air. The relationship (correlation) uniquely determined for each engine rotation speed N is thus established between the intake pipe pressure P and the intake air quantity Q, as shown in FIG. 6.

Therefore, the cylinder intake air quantity Q can be calculated on the basis of a detected intake pipe pressure P and a known engine rotation speed N.

This enables the cylinder intake air quantity Q to be calculated on the basis of each of the output signals from the air flow sensor 103, throttle sensor 104, and intake pipe pressure sensor 128.

Figure 7:
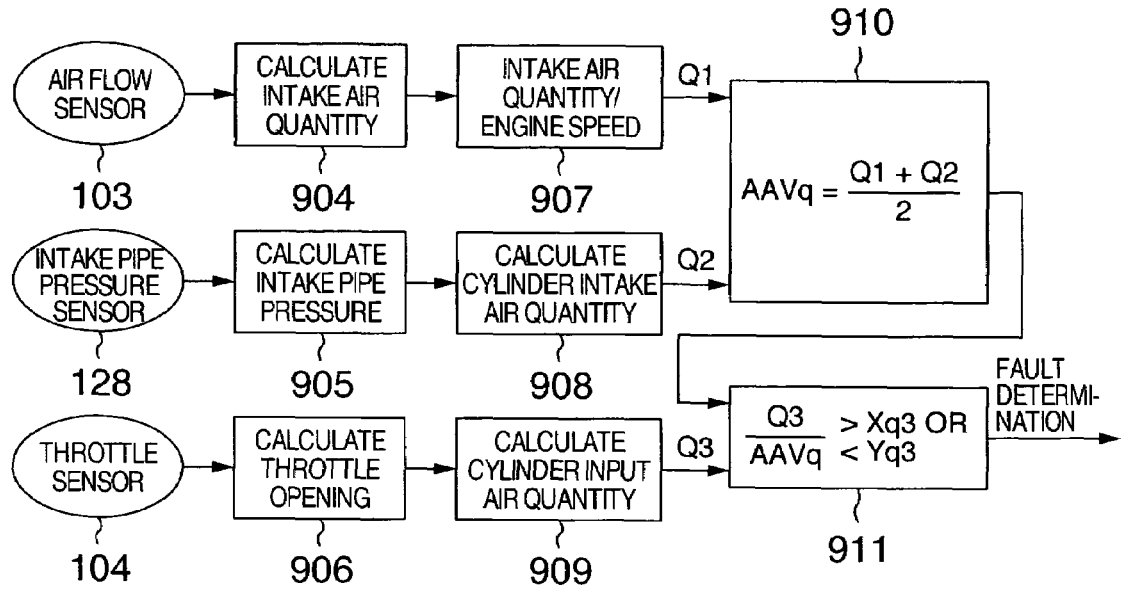
FIG. 7 is a block diagram showing an embodiment in which the fault diagnosis apparatus for sensors according to the present invention is applied to diagnosis of a fault in sensors in association with the intake air quantity of the engine.

With reference to FIG. 7, description will be given of an embodiment of a diagnosis apparatus that diagnoses a fault in the sensors using the above principle.

This diagnosis apparatus is embodied by the microcomputer-based control unit 115 executing an appropriate computer program. The diagnosis apparatus includes physical quantity calculation sections 904, 905, and 906, physical quantity conversion sections 907, 908, and 909, an average value calculation section 910 serving as determination criterion calculation means, and a comparative determination section 911.

Output signals from the air flow sensor 103, throttle sensor 104, and intake pipe pressure sensor 128 are analog signals based on voltages according to the present embodiment.

The physical quantity calculation sections 904, 905, and 906 convert the analog signals from the air flow sensor 103, throttle sensor 104, and intake pipe pressure sensor 128 into digital signals to calculate physical quantities for the intake air quantity, intake pipe pressure, and throttle opening.

The intake air quantity calculated on the basis of the signal from the air flow sensor 103 is input to the physical quantity conversion section 907, which in turn divides the input intake air quantity by the engine rotation speed N to determine the cylinder intake air quantity Q.

The intake pipe pressure calculated on the basis of the signal from the intake pipe pressure sensor 128 is input to the physical quantity conversion section 908. The physical quantity conversion section 908 then determines the cylinder intake air quantity Q in accordance with such correlations as shown in FIG. 6, on the basis of the input intake pipe pressure P and engine rotation speed N.

The throttle opening calculated on the basis of the signal from the throttle sensor 104 is input to the physical quantity conversion section 909. The physical quantity conversion section 909 then determines the cylinder intake air quantity Q in accordance with such correlations as shown in FIG. 6, on the basis of the input throttle opening (intake opening area S) and engine rotation speed N.

The above processing indicates that the cylinder intake air quantity Q, corresponding to the same physical quantity, can be determined from each of the signals from the air flow sensor 103, intake pipe pressure sensor 128, and throttle sensor 104.

Figure 1:
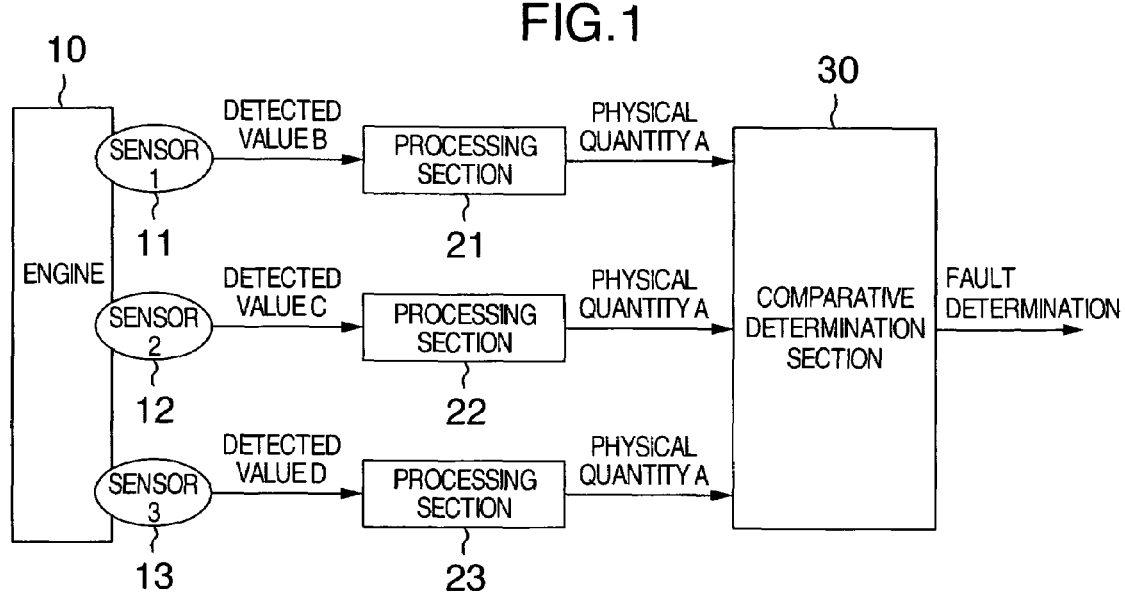
FIG. 1 is a block diagram illustrating the principle of a fault diagnosis apparatus for sensors according to the present invention.

Consequently, as described in FIG. 1, a quantitative comparison of the cylinder intake air quantity Q makes it possible to determine which of the air flow sensor 103, intake pipe pressure sensor 128, and throttle sensor 104 is faulty.

In an embodiment of the detection process, the average value calculation section 910 determines an average value AAVq=(Q1+Q2)/2 where Q1 denotes the cylinder intake air quantity Q based on the output signal from the air flow sensor 103 and Q2 denotes the cylinder intake air quantity Q based on the output signal from the intake pipe pressure sensor 128. The average value AAVq is a determination criterion value for determining whether or not the throttle sensor 104 is faulty.

The comparative determination section 911 determines the ratio of Q3 to the average value AAVq (Q3/AAVq) where Q3 denotes the cylinder intake air quantity Q based on the output signal from the throttle sensor 104.

If each sensor has no measurement error and each calculation involves no error, the ratio (Q3/AAVq) of the cylinder intake air quantity Q3 based on the throttle sensor 104 to the average value AAVq is 1. If the signal from throttle sensor 104 has an error, the ratio (Q3/AAVq) deviates from 1 depending on the error.

The ratio (Q3/AAVq) is an index indicating an error in the throttle sensor 104. If the deviation of the ratio (Q3/AAVq) from 1 is equal to or larger than a predetermined value, the throttle sensor 104 can be determined to be faulty.

Accordingly, the comparative determination section 911 determines that the throttle sensor 104 is faulty if the ratio (Q3/AAVq) is larger than a predetermined value Xq3 or smaller than a predetermined value Yq3.

The average value AAVq is the average of the cylinder intake air quantities Q determined on the basis of the output signals from the air flow sensor 103 and intake pipe pressure sensor 128. Accordingly, even if both sensors have measurement errors, the average value is close to the true cylinder intake air quantity. This enables an accurate comparison of the cylinder intake air quantity Q3 based on the signal from the throttle sensor 104 and the cylinder intake air quantity corresponding to the average value AAVq. This makes it possible to accurately determine whether or not the throttle sensor 104 is faulty.

The above description has been given of the calculations and determinations required to detect a fault in the throttle sensor 104. Although not shown, similar calculations and determinations make it possible to accurately determine whether or not the air flow sensor 103 or the intake pipe pressure sensor 128 is faulty.

To determine whether or not the air flow sensor 102 is faulty, it is possible to average the cylinder intake air quantities determined on the basis of the output signals from the intake pipe pressure sensor 128 and throttle sensor 104 and then to compare the average value with the cylinder intake air quantity determined on the basis of the output signal from the air flow sensor 102.

Similarly, to determine whether or not the intake pipe pressure sensor 128 is faulty, it is possible to average the cylinder intake air quantities determined on the basis of the output signals from the air flow sensor 103 and throttle sensor 104 and then to compare the average value with the cylinder intake air quantity determined on the basis of the output signal from the intake pipe pressure sensor 128.

Figure 8:
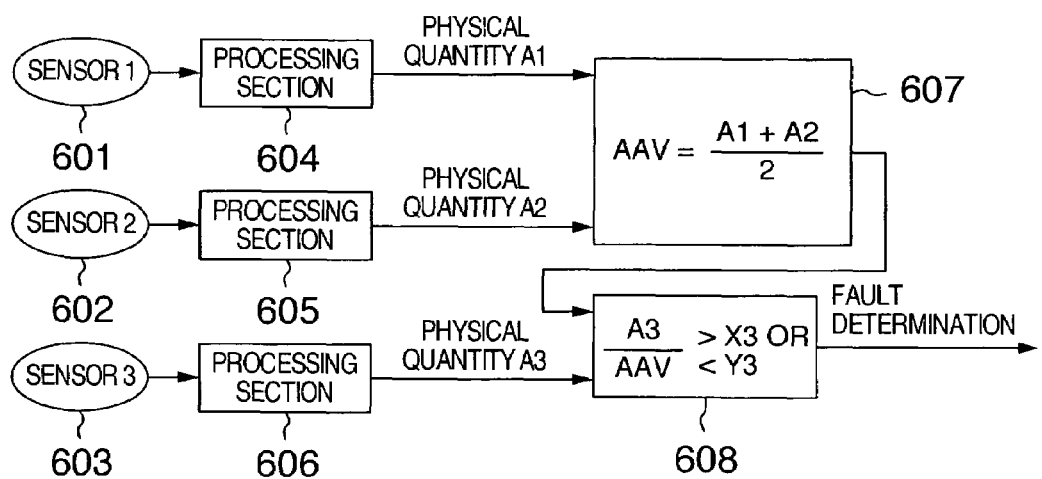
FIG. 8 is a control block diagram showing an embodiment of the fault diagnosis apparatus for sensors according to the present invention.

FIG. 8 shows a generalized fault diagnosis apparatus described with reference to the specific example. Conversion processing section 606 converts an output signal from one 603 of three sensors 601, 602, and 603 into a calculated value A3 corresponding to a physical quantity (same physical quantity). Conversion processing section 604 and 605 convert output signals from the other sensors 601 and 602 into calculated values A1 and A2 corresponding to a physical quantity (same physical quantity). The calculated value A3 is compared with the average value AAV of the calculated values A1 and A2.

The average value AAV is calculated by determination criterion calculation section 607. Among the plurality of (at least three) sensors 601, 602, and 603, the determination criterion calculation section 607 calculates the arithmetic average value for the same physical quantities of the sensors 601 and 602, except the one 603 to be subjected to fault determination and determines it to be a determination criterion value for the sensor 603 to be subjected to fault determination.

The average value AAV is compared with the calculated value A3 for the same physical quantity obtained by the sensor 603, by the comparative determination section 608. The comparative determination section 608 determines that the sensor 603 is faulty if the ratio (A3/AAV) of the average value AAV to the calculated value A3 for the same physical quantity obtained by the sensor 603 is larger than a predetermined value X3 or smaller than a predetermined value Y3.

The effect of this process is not limited to the sensor 603. A similar effect is produced by executing similar calculations and determinations on the sensor 601 or 602.

In the present embodiment, in general, a determination criterion value for defect determination is determined on the basis of detection outputs from at least two of at least three sensors and the other detection outputs. The determination criterion value is compared with the output from at least one of the sensors to determine whether or not the compared sensor is defective.

Figure 9:
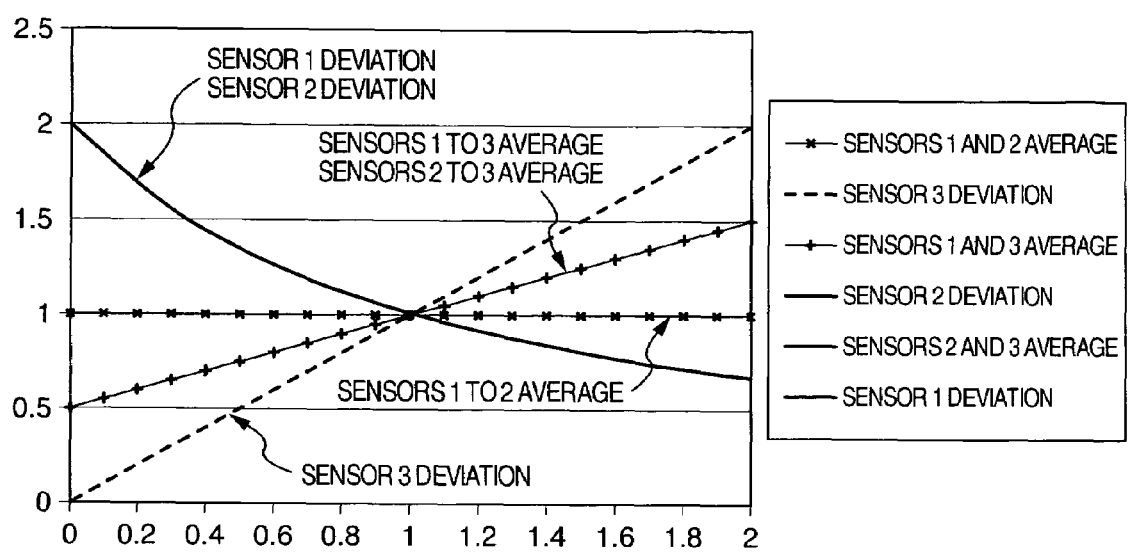
FIG. 9 is a graph showing a result of simulation of fault determination performance of the fault diagnosis apparatus for sensors according to the embodiment shown in FIG. 8.

With reference to FIG. 9, description will be given of simulation of fault determination performance of the present embodiment. In FIG. 9, the axis of abscissa indicates the calculated value of the physical quantity obtained by the sensor 3 (603) when the calculated values of the physical quantities obtained by the sensors 1 and 2 (601 and 602) are always 1, indicating the proper condition, whereas the calculated value of the physical quantity obtained by the sensor 3 (603) varies from 0 to 2. The axis of ordinate indicates the average value, around 1, of the physical quantities obtained by the pair of the sensors 1 and 2, the pair of the sensors 1 and 3, and the pair of the sensors 2 and 3, as well as the deviation from the average, around 1, of calculated value of the physical quantity obtained by the compared sensor.

For example, the deviation of calculated value of the physical quantity obtained by the sensor 3 is a value obtained by dividing the deviation of calculated value of the physical quantity obtained by the sensor 3, by the average of calculated values of the physical quantities obtained by the sensors 1 and 2. As shown in FIG. 9, this value is 1 when the calculated value of the physical quantity obtained by the sensor 3 is 1, that is, when the sensor 3 is in a proper state.

FIG. 9 indicates that as the sensor 3 deviates further from its proper state, that is, as the value on the axis of abscissa deviates further from 1, the deviation of calculated value of the physical quantity obtained by the sensor 3 deviates further from 1.

The degree of the deviation is always larger than those of deviations of calculated values of the physical quantities obtained by the sensors 1 and 2. Consequently, a fault in the sensor 3 can be adequately detected by appropriately selecting a predetermined threshold for defect determination taking into account the accuracies of the group of sensors and system to which the present embodiment is applied, the linearity of indices, and the like.

FIG. 9 shows an example in which the sensor 3 is faulty. However, it is easily understood that the same phenomenon occurs when the sensor 1 or 2 is faulty.

Figure 10:
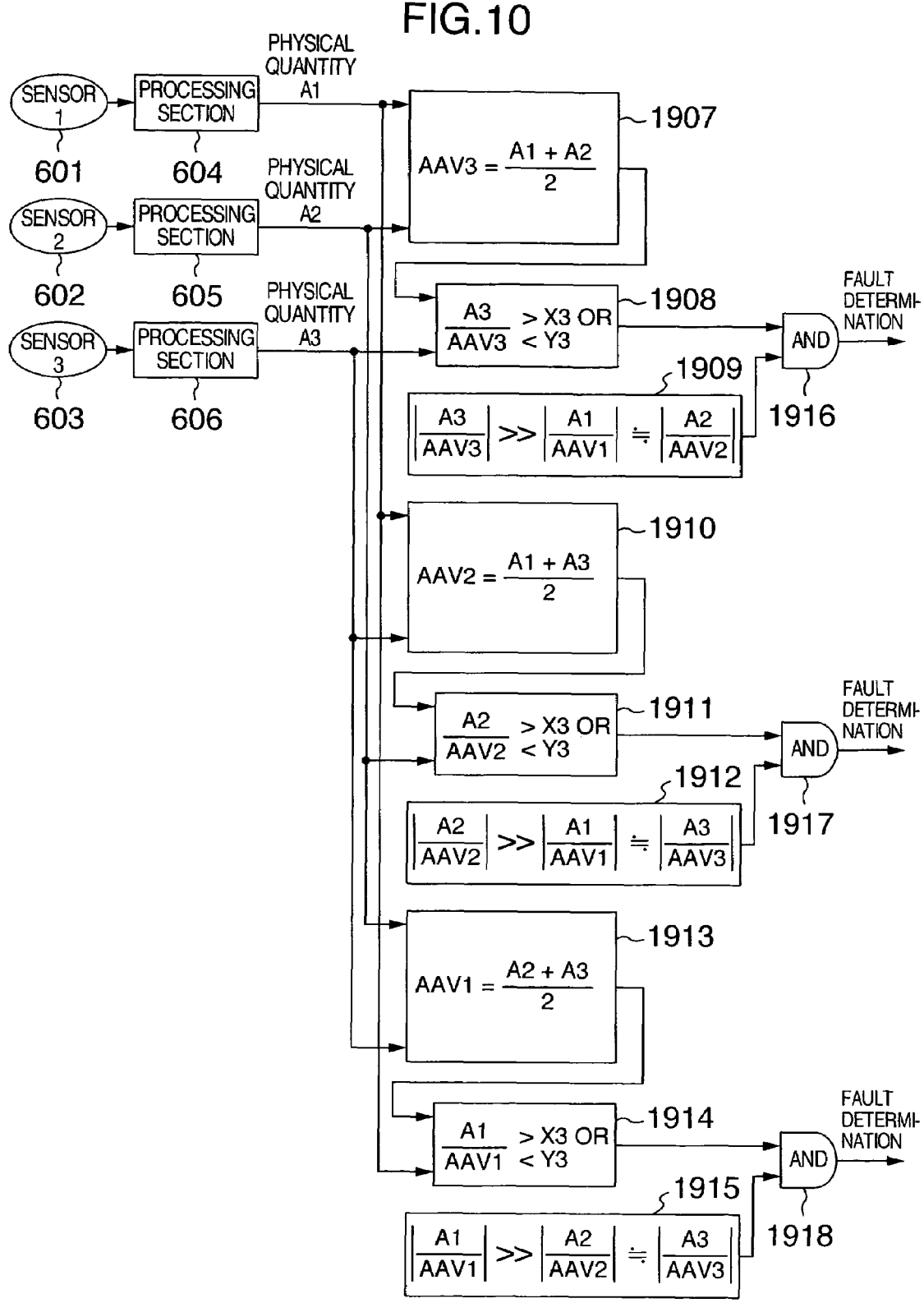
FIG. 10 is a control block diagram showing another embodiment of the fault diagnosis apparatus for sensors according to the present invention.

Now, with reference to FIG. 10, description will be given of another embodiment of a fault diagnosis apparatus for sensors according to the present invention. In the present embodiment, on the basis of the embodiment shown in FIG. 8, the accuracy of fault determination is improved utilizing the accuracy of the group of sensors and system to which the present invention is applied as well as the linearity of indices. In FIG. 10, components corresponding to those in FIG. 8 are denoted by the same reference numerals as those shown in FIG. 8 with their description omitted.

Whether or not the sensor 603 is faulty is determined as follows. Determination criterion calculation section 1907 determines the average AAV3 of calculated values A1 and A2 of the physical quantities (of the same type) into which the output signals from the sensors 601 and 602 are converted. Comparison section 1908 checks the ratio (A3/AAV3) of the calculated value A3 of the same physical quantity obtained by the sensor 603 to the average value AAV3 to determine whether the ratio is larger than a predetermined value X3 or smaller than a predetermined value Y3. An AND gate 1916 takes the logical AND of this comparison result and a comparison result from another comparison section 1908. Only when both conditions are established, the apparatus determines that the sensor 603 is faulty.

The comparison section 1908 determines whether or not the ratio (A1/AAV1) of the calculated value A1 of the same physical quantity obtained by the sensor 601 to the average AAV1 of calculated values A2 and A3 of the physical quantities (of the same type) into which the output signals from the sensors 602 and 603 are converted is almost equal to the ratio (A2/AAV2) of the calculated value A2 of the same physical quantity obtained by the sensor 602 to the average AAV2 of calculated values A1 and A3 of the physical quantities (of the same type) into which the output signals from the sensors 601 and 603 are converted. The comparison section 1908 further determines whether or not the absolute value of ratio (A3/AAV3) of the calculated value A3 of the same physical quantity obtained by the sensor 603 to the average value AAV3 deviates from the above absolute values.

As is understood from FIG. 9, previously described, when the sensor 603 (sensor 3) is faulty, the deviation of calculated value of the physical quantity obtained by the sensor 603, that is, (A3/AAV3), deviates from 1, and the deviation of calculated value of the physical quantity obtained by the sensor 601 (sensor 1), that is, (A1/AAV1), and the deviation of calculated value of the physical quantity obtained by the sensor 602 (sensor 2), that is, (A2/AAV2), also deviate from 1.

Accordingly, the comparative determination by the comparison section 1908 is a process for preventing the apparatus from determining that the sensors 601 and 603 are also faulty.

When the sensor 603 is faulty, the absolute value of the (A3/AAV3) is significantly larger than those of the (A1/AAV1) and (A2/AAV2), and there is no significant difference in absolute value between the (A1/AAV1) and (A2/AAV2). Utilizing this, the comparison section 1908 performs an appropriate determination operation to more reliably determine whether or not the sensor 603 is faulty.

The fault determination in the above embodiment is also applicable to fault determinations for the sensors 601 and 602.

Whether or not the sensor 602 is faulty is determined as follows. Determination criterion calculation means 1910 determines the average AAV2 of calculated values A1 and A3 of the physical quantities (of the same type) into which the output signals from the sensors 601 and 603 are converted. Comparison section 1911 checks the ratio (A2/AAV2) of the calculated value A2 of the same physical quantity obtained by the sensor 603 to the average value AAV2 to determine whether the ratio is larger than the predetermined value X3 or smaller than the predetermined value Y3. An AND gate 1917 takes the logical AND of this comparison result and a comparison result from another comparison section 1912. Only when both conditions are established, the apparatus determines that the sensor 602 is faulty.

The comparison section 1912 determines whether or not the ratio (A1/AAV1) of the calculated value A1 of the same physical quantity obtained by the sensor 601 to the average AAV1 of calculated values A2 and A3 of the physical quantities (of the same type) into which the output signals from the sensors 602 and 603 are converted is almost equal to the ratio (A3/AAV3) of the calculated value A3 of the same physical quantity obtained by the sensor 603 to the average AAV3 of calculated values A1 and A2 of the physical quantities (of the same type) into which the output signals from the sensors 601 and 602 are converted. The comparison section 1912 further determines whether or not the absolute value of ratio (A2/AAV2) of the calculated value A2 of the same physical quantity obtained by the sensor 602 to the average value AAV2 deviates from the above absolute values.

Whether or not the sensor 601 is faulty is determined as follows. Determination criterion calculation section 1913 determines the average AAV1 of calculated values A2 and A3 of the physical quantities (of the same type) into which the output signals from the sensors 602 and 603 are converted. Comparison section 1914 checks the ratio (A1/AAV1) of the calculated value A1 of the same physical quantity obtained by the sensor 601 to the average value AAV1 to determine whether the ratio is larger than the predetermined value X3 or smaller than the predetermined value Y3. An AND gate 1918 takes the logical AND of this comparison result and a comparison result from another comparison section 1915. Only when both conditions are established, the apparatus determines that the sensor 601 is faulty.

The comparison section 1915 determines whether or not the ratio (A2/AAV2) of the calculated value A1 of the same physical quantity obtained by the sensor 602 to the average AAV2 of calculated values A1 and A3 of the physical quantities (of the same type) into which the output signals from the sensors 601 and 603 are converted is almost equal to the ratio (A3/AAV3) of the calculated value A3 of the same physical quantity obtained by the sensor 603 to the average AAV3 of calculated values A1 and A2 of the physical quantities (of the same type) into which the output signals from the sensors 601 and 602 are converted. The comparison section 1915 further determines whether or not the absolute value of ratio (A1/AAV1) of the calculated value A1 of the same physical quantity obtained by the sensor 601 to the average value AAV1 deviates from the above absolute values.

This makes it possible to perform more reliable determination operations on all sensors 601 to 603 to be subjected to fault determinations.

In the example shown in the above embodiment, a comparison with the average value is carried out by determining the corresponding ratio. The method for comparing a certain value with the average value may be appropriately selected on the basis of the nature of the target error, the performance of the calculation section, and the like. For example, the comparison may be based on differences.

The fault diagnosis apparatus according to the present invention essentially has at least three sensors that detect, in different conditions, a phenomenon in a certain part of the vehicle or in the condition of the power plant, a unit that compares detection outputs from the at least three sensors with one another, and a unit that determines whether or not each pair of comparison results has a difference of at least a given predetermined value. The output involving a difference of at least the given predetermined value is compared with the output not involving a difference of at least the given predetermined value to determine one of the sensors to be defective. Accordingly, various other methods are possible for comparing the outputs with one another.

For example, a comparison method is possible which compares the average of output values of the at least three sensors with each detected value to determine whether or not the corresponding sensor is defective. A more general method is to determine a determination criterion for determining a defect on the basis of detection outputs from the at least three sensors and to compare the determination criterion with the output from at least one of the sensors to determine whether or not the compared sensor is defective.

Figure 11:
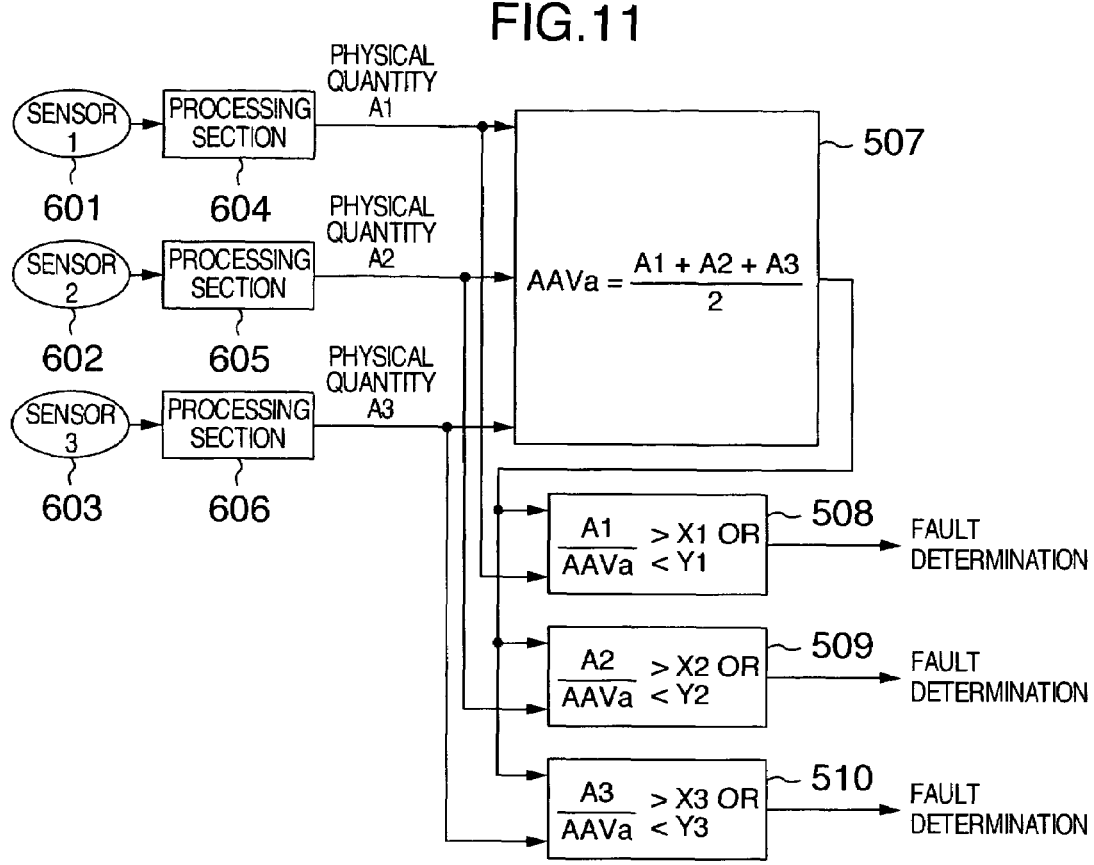
FIG. 11 is a control block diagram showing another embodiment of the fault diagnosis apparatus for sensors according to the present invention.

With reference to FIG. 11, description will be given of an embodiment of a fault diagnosis apparatus based on the above comparison method. In FIG. 11, components corresponding to those in FIG. 8 are denoted by the same reference numerals as those shown in FIG. 8 with their description omitted.

In the present embodiment, determination criterion calculation section 507 calculates the average AAVa=(A1+A2+A3)/3 of the calculated values A1, A2, and A3 of the physical quantities (of the same type) into which the output signals from the three sensors 601, 602, and 603 are converted. The resulting value is determined to be a common determination criterion value.

Comparative determination section 508 for determining whether or not the sensor 601 is faulty determines that the sensor 601 is faulty if the ratio (A1/AAVa) of the calculated value A1 of the physical quantity (same physical quantity) into which the output signal from the sensor 601 is converted to the average value AAVa is larger than a predetermined value X1 or smaller than a predetermined value Y1.

Comparative determination section 509 for determining whether or not the sensor 602 is faulty determines that the sensor 602 is faulty if the ratio (A2/AAVa) of the calculated value A2 of the physical quantity (same physical quantity) into which the output signal from the sensor 602 is converted to the average value AAVa is larger than a predetermined value X2 or smaller than a predetermined value Y2.

Comparative determination section 510 for determining whether or not the sensor 603 is faulty determines that the sensor 603 is faulty if the ratio (A3/AAVa) of the calculated value A3 of the physical quantity (same physical quantity) into which the output signal from the sensor 603 is converted to the average value AAVa is larger than a predetermined value X3 or smaller than a predetermined value Y3.

In other words, the comparative determination sections 508, 509, and 510 determine the ratios of calculated values A1, A2, and A3, respectively, of the same physical quantity to the average value AAVa, a common determination criterion value. The comparative determination sections 508, 509, and 510 then determine whether or not the respective ratios exceed the respective predetermined values X1 and Y1, X2 and Y2, and X3 and Y3. If any ratio exceeds the corresponding predetermined values, the comparative determination section determines that a fault is occurring in the sensor from which the corresponding one of the compared calculated values A1, A2, and A3 of the same physical quantity has been obtained.

In other words, the determination utilizes the phenomenon in which if any one of the sensors 601, 602, and 603 is faulty, any of the compared calculated values A1, A2, and A3 of the same physical quantity is significantly different from the average value AAVa. This makes it possible to precisely determine whether or not, for example, the throttle sensor 104 is faulty.

Figure 12:
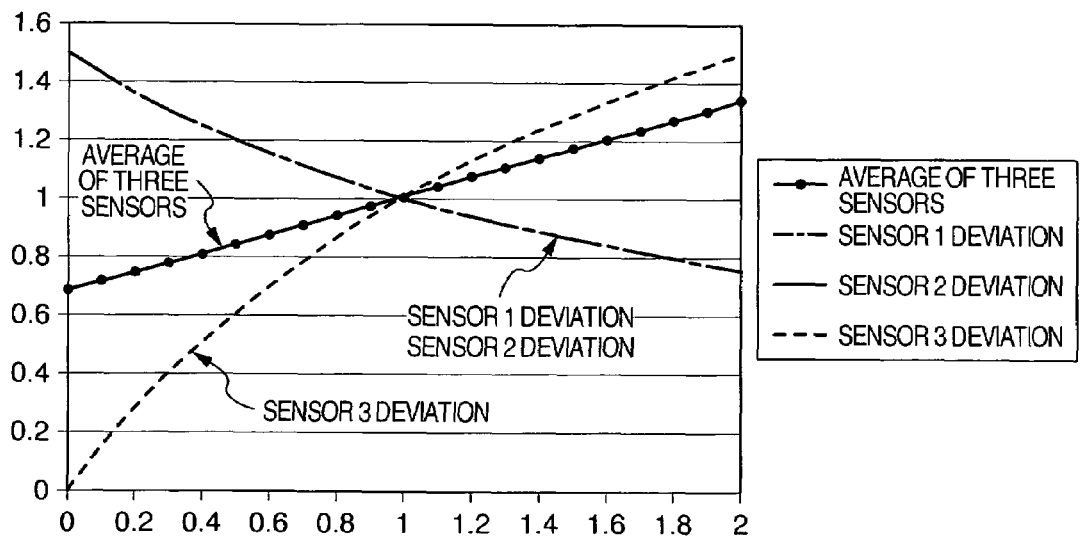
FIG. 12 is a graph showing a result of simulation of fault determination performance of the fault diagnosis apparatus for sensors according to another embodiment shown in FIG. 11.

With reference to FIG. 12, description will be given of simulation of fault determination performance of the present embodiment. In FIG. 12, the axis of abscissa indicates the calculated value of the physical quantity obtained by the sensor 3 (603) when the calculated values of the physical quantities obtained by the sensors 1 and 2 (601 and 602) are always 1, indicating the proper condition, whereas the calculated value of the physical quantity obtained by the sensor 3 (603) varies from 0 to 2. The axis of ordinate indicates the average value, around 1, of the physical quantities obtained by the sensors 1, 2, and 3, as well as the deviation from the average, around 1, of calculated value of the physical quantity obtained by the compared sensor.

For example, the deviation of calculated value of the physical quantity obtained by the sensor 3 is a value obtained by dividing the deviation of calculated value of the physical quantity obtained by the sensor 3, by the average of calculated values of the physical quantities obtained by the sensors 1, 2, and 3. As shown in the figure, this value is 1 when the calculated value of the physical quantity obtained by the sensor 3 is 1, that is, when the sensor 3 is in a proper state.

FIG. 12 indicates that as the sensor 3 deviates further from its proper state, that is, as the value on the axis of abscissa deviates further from 1, the deviation of calculated value of the physical quantity obtained by the sensor 3 deviates further from 1.

The degree of the deviation is always larger than those of deviations of calculated values of the physical quantities obtained by the sensors 1 and 2. Consequently, a fault in the sensor 3 can be adequately detected by appropriately selecting a predetermined threshold for defect determination taking into account the accuracies of the group of sensors and system to which the present invention is applied, the linearity of indices, and the like.

FIG. 12 shows an example in which the sensor 3 is faulty. However, it is easily understood that the same phenomenon occurs when the sensor 1 or 2 is faulty.

Figure 13:
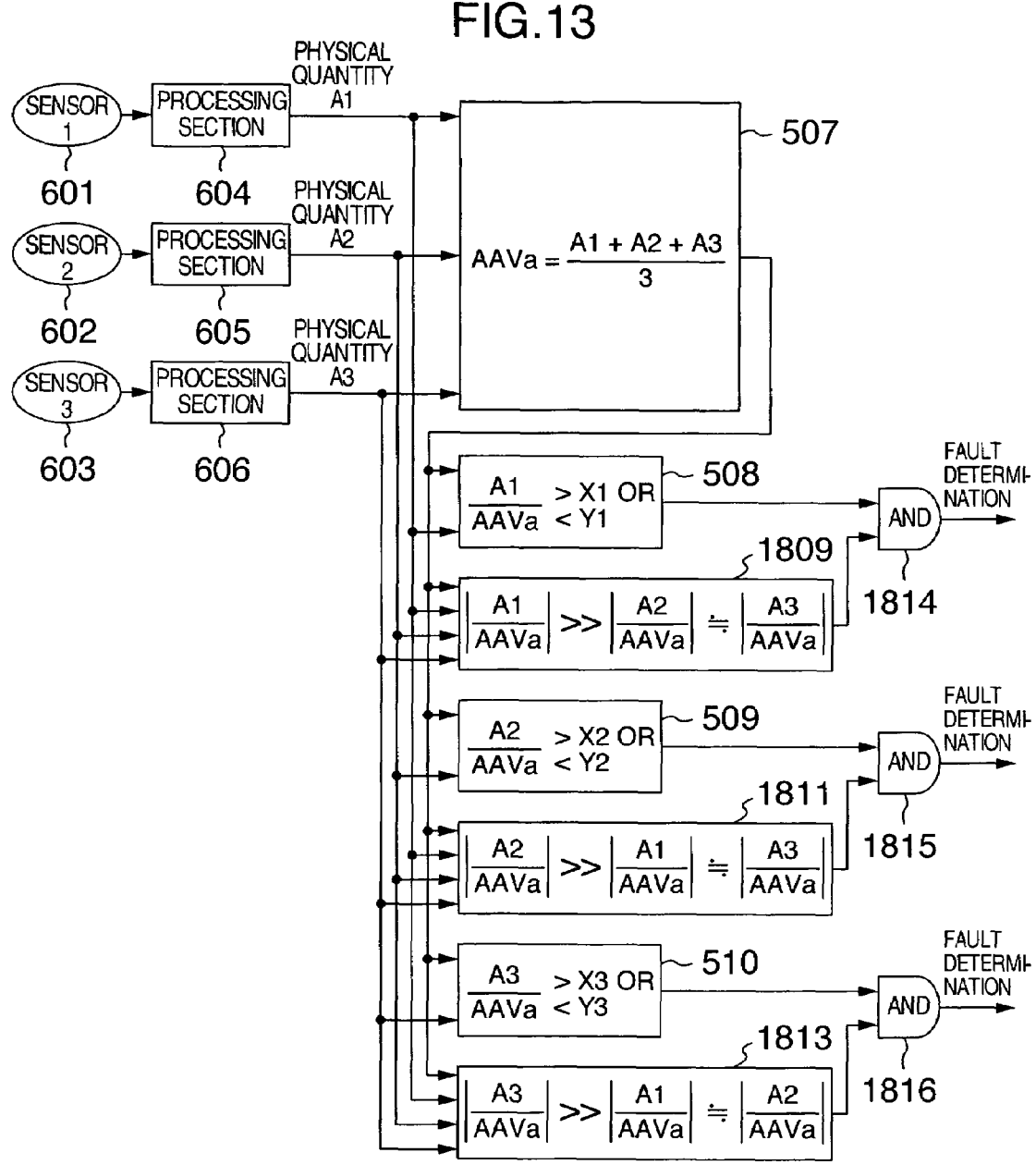
FIG. 13 is a control block diagram showing yet another embodiment of the fault diagnosis apparatus for sensors according to the present invention.

Now, with reference to FIG. 13, description will be given of another embodiment of a fault diagnosis apparatus for sensors according to the present invention. In the present embodiment, on the basis of the embodiment shown in FIG. 11, the accuracy of fault determination is further improved utilizing the accuracies of the group of sensors and system to which the present invention is applied as well as the linearity of indices. In FIG. 13, components corresponding to those in FIG. 11 are denoted by the same reference numerals as those shown in FIG. 11 with their description omitted.

Whether or not the sensor 601 is faulty is determined as follows. An AND gate 1814 takes the logical AND of a comparison result from the comparison section 508 and a comparison result from another comparison section 1809. Only when both conditions are established, the apparatus determines that the sensor 601 is faulty.

The comparison section 1809 determines whether or not the ratio (A2/AAVa) of the calculated value A2 of the same physical quantity obtained by the sensor 602 to the average AAVa is almost equal to the ratio (A3/AAVa) of the calculated value A3 of the same physical quantity obtained by the sensor 603 to the average AAVa. The comparison section 1809 further determines whether or not the absolute value of ratio (A1/AAVa) of the calculated value A1 of the same physical quantity obtained by the sensor 601 to the average value AAVa deviates from the above absolute values.

Whether or not the sensor 602 is faulty is determined as follows. An AND gate 1815 takes the logical AND of a comparison result from the comparison section 509 and a comparison result from another comparison section 1811. Only when both conditions are established, the apparatus determines that the sensor 602 is faulty.

The comparison section 1811 determines whether or not the ratio (A1/AAVa) of the calculated value A1 of the same physical quantity obtained by the sensor 601 to the average AAVa is almost equal to the ratio (A3/AAVa) of the calculated value A3 of the same physical quantity obtained by the sensor 603 to the average AAVa. The comparison section 1811 further determines whether or not the absolute value of ratio (A2/AAVa) of the calculated value A2 of the same physical quantity obtained by the sensor 602 to the average value AAVa deviates from the above absolute values.

Whether or not the sensor 603 is faulty is determined as follows. An AND gate 1816 takes the logical AND of a comparison result from the comparison section 510 and a comparison result from another comparison section 1813. Only when both conditions are established, the apparatus determines that the sensor 603 is faulty.

The comparison section 1814 determines whether or not the ratio (A1/AAVa) of the calculated value A1 of the same physical quantity obtained by the sensor 601 to the average AAVa is almost equal to the ratio (A2/AAVa) of the calculated value A2 of the same physical quantity obtained by the sensor 602 to the average AAVa. The comparison section 1814 further determines whether or not the absolute value of ratio (A3/AAVa) of the calculated value A3 of the same physical quantity obtained by the sensor 603 to the average value AAVa deviates from the above absolute values.

FIG. 12 shows an example in which the sensor 3 (sensor 603) is faulty. However, it is easily understood that the same phenomenon occurs when the sensor 1 or 2 (sensor 601 or 602) is faulty. As is understood from FIG. 12, when the sensor 601 is faulty, the deviation of calculated value of the physical quantity obtained by the sensor 601, that is, (A1/AAVa), deviates from 1, and the deviation of calculated value of the physical quantity obtained by the sensor 602, that is, (A2/AAVa), and the deviation of calculated value of the physical quantity obtained by the sensor 603, that is, (A3/AAVa), also deviate from 1.

Accordingly, the comparative determination by the comparison section 1809 is a process for preventing the apparatus from determining that the sensors 602 and 603 are also faulty.

When the sensor 601 is faulty, the absolute value of the (A1/AAVa) is significantly larger than those of the (A2/AAVa) and (A3/AAVa), and there is no significant difference in absolute value between the (A2/AAVa) and (A3/AAVa). Utilizing this, the comparison section 1809 performs an appropriate determination operation to more reliably determine whether or not the sensor 601 is faulty.

The above fault determination is also applicable to fault determinations for the sensors 602 and 603. This makes it possible to perform more reliable determination operations on all sensors 601 to 603 to be subjected to fault determinations.

Another comparison method provides a comparison unit that compares detection outputs from the at least three sensors with one another, and a determination unit that determines whether or not each pair of comparison results has at least a difference of a given predetermined value. The output involving a difference of at least the given predetermined value is compared with the output not involving a difference of at least the given predetermined value to determine one of the sensors to be defective.

In other words, this method provides a comparison unit that compares each set of outputs from two of at least three sensors and a determination unit that determines whether or not the difference between the outputs of each set determined by the comparison means is equal to or larger than the predetermined value. The set involving a difference of at least the given predetermined value is compared with the set not involving a difference of at least the given predetermined value to determine one of the sensors to be defective.

Figure 14:
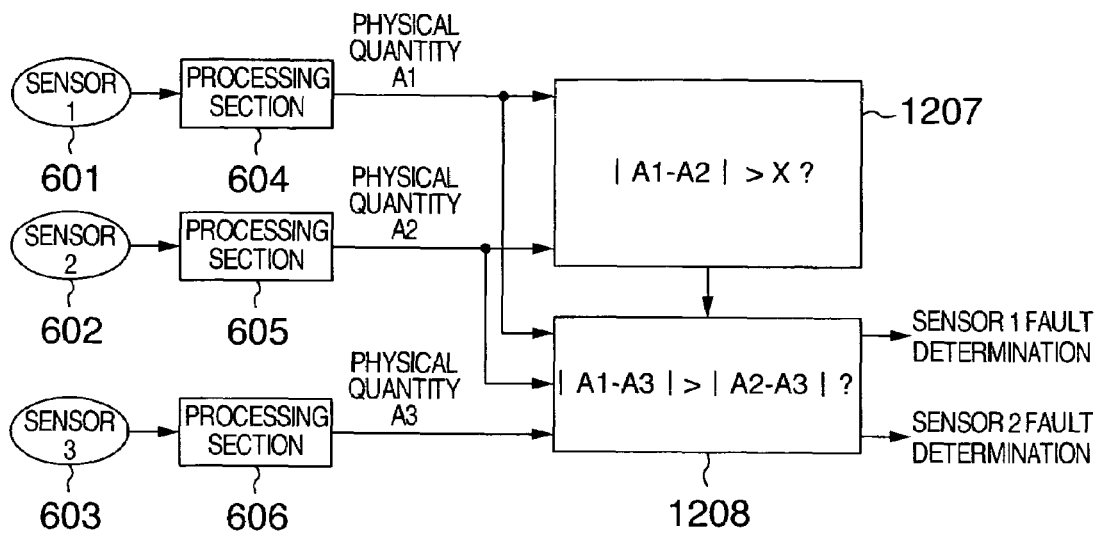
FIG. 14 is a control block diagram showing still another embodiment of the fault diagnosis apparatus for sensors according to the present invention.

With reference to FIG. 14, description will be given of an embodiment of a fault diagnosis apparatus based on this comparison method. In FIG. 14, components corresponding to those in FIG. 8 are denoted by the same reference numerals as those shown in FIG. 8 with their description omitted.

The fault diagnosis apparatus of the present embodiment includes a comparison section 1207 and a determination section 1208.

The comparison section 1207 considers the sensors 601 and 602 to be a set to determine whether or not a predetermined value X corresponding to a significant difference is smaller than the absolute value of the difference between the calculated value A1 of the physical quantity (same physical quantity) into which the output signal from the sensor 601 is converted and the calculated value A2 of the physical quantity (same physical quantity) into which the output signal from the sensor 602 is converted.

The presence of the significant difference can be determined when the sensor 601 or 602 is faulty as is the case with the comparison of measurements from two sensors as described with reference to FIG. 20.

In this case, that is, when the comparison section 1207 determines the presence of the significant difference, the determination section 1208 compares the calculated value A3 of the physical quantity (same physical quantity) into which the output signal from the sensor 603 is converted, with the calculated value A1 based on the output signal from the sensor 601. The determination section 1208 also compares the calculated value A3 based on the output signal from the sensor 603 with the calculated value A1 based on the output signal from the sensor 601. The comparisons use the absolute values of the differences.

Here, either the sensor 601 or 602 is faulty and the probability of two difference sensors simultaneously becoming faulty is negligible as previously described. This makes it possible to consider the calculated value A3 for the sensor 603 to be close to the true value.

Therefore, by determining which of the calculated value A1 for the sensor 601 and the calculated value A2 for the sensor 602 deviates from the calculated value A3 for the sensor 603, it is possible to determine which of the sensors 601 and 602 is faulty.

Specifically, in the present embodiment, if the absolute value of the difference between the calculated values A1 and A3 is larger than the absolute value of the difference between the calculated values A2 and A3, the sensor 601 is determined to be faulty. Otherwise the sensor 602 is determined to be faulty.

As described above, the embodiment shown in FIG. 14 can determine whether or not the sensors 601 and 602 are faulty. Although not shown, executing similar determinations on the set of the sensors 601 and 603 and/or the set of the sensors 602 and 603 makes it possible to determine which of the sensors 601, 602, and 603 is faulty.

The above embodiment determines one of the at least three sensors which deviates from the others to be defective.

The present embodiment uses the absolute value of the difference for the comparison required to determine the presence of the significant difference. However, it is specifically understood that the comparison method may be appropriately selected on the basis of the nature of the target error, the performance of the calculation section, or the like, as previously described.

For example, the embodiment provides a comparison section that compares detection outputs from at least three sensors with one another, and a determination section that determines whether or not each pair of the compared detection outputs have a difference of at least a given determined value. The output involving a difference of at least the given predetermined value may be compared with the output not involving a difference of at least the given predetermined value to determine one of the sensors to be defective.

In other words, the set involving a difference of at least the given predetermined value may be compared with the set not involving a difference of at least the given predetermined value to determine one of the sensors to be defective.

Figure 15:
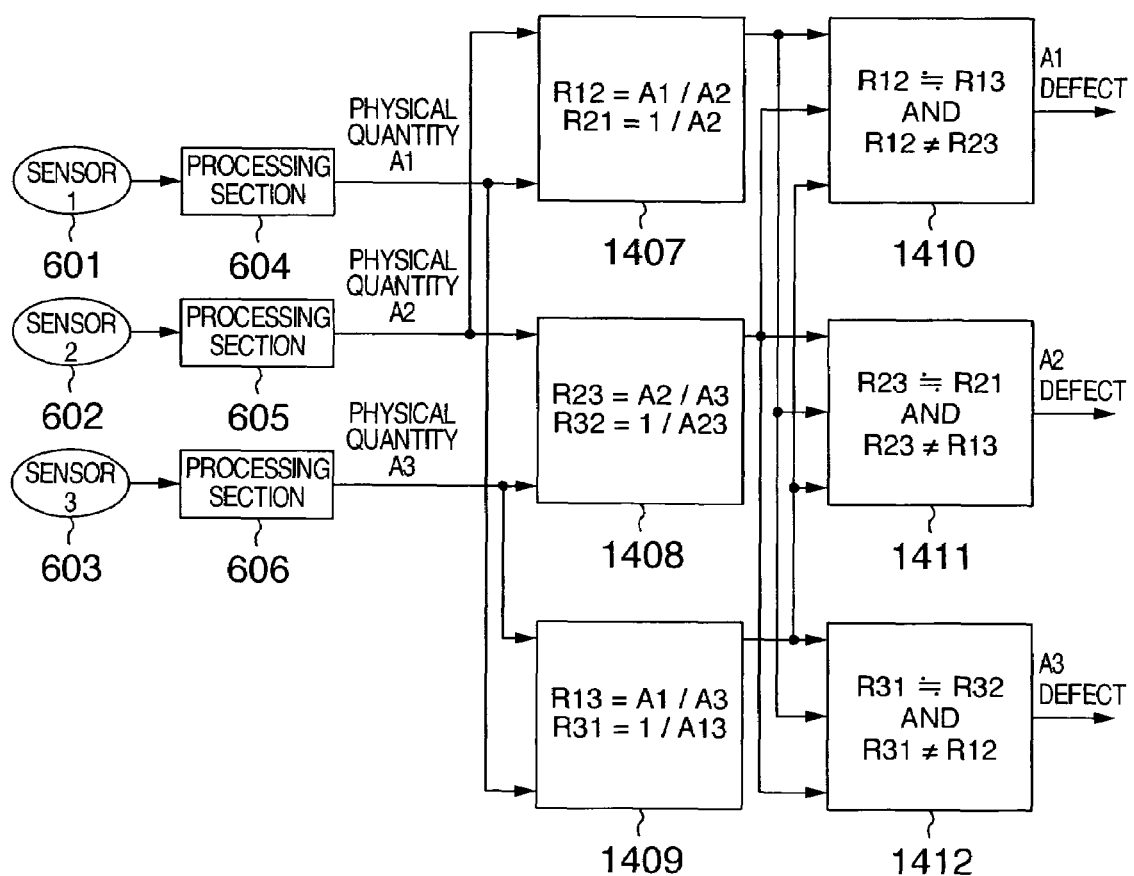
FIG. 15 is a control block diagram showing further another embodiment of the fault diagnosis apparatus for sensors according to the present invention.

With reference to FIG. 15, description will be given of an embodiment of a fault diagnosis apparatus based on this determination method. In FIG. 15, components corresponding to those in FIG. 8 are denoted by the same reference numerals as those shown in FIG. 8 with their description omitted.

The fault diagnosis apparatus includes comparative calculation sections 1407, 1408, and 1409 that calculate the ratio of a set of the calculated values of physical quantities obtained by two different sensors, and determination sections 1410, 1411, and 1412.

The comparative calculation section 1407 calculates the ratio R12=A1/A2 of the physical-quantity calculated value A1 to the physical-quantity calculated value A2, and the inverse ratio R21=1/R12.

The comparative calculation section 1408 calculates the ratio R23=A2/A3 of the physical-quantity calculated value A2 to the physical-quantity calculated value A3, and the inverse ratio R32=1/R23.

The comparative calculation section 1409 calculates the ratio R13=A1/A3 of the physical-quantity calculated value A1 to the physical-quantity calculated value A3, and the inverse ratio R31=1/R13.

It is easily understood that these ratios exhibit values close to 1 if the sensors are not faulty.

The determination sections 1410, 1411, and 1412 compare the ratios with one another to determine whether or not the respective sensors are faulty.

If the ratios R12 and R13 have no significant difference, whereas the ratios R12 and R23 have a significant difference, then the determination section 1410 determines that a fault is occurring in the sensor 601 having provided the input from which the physical-quantity calculated value A1 has been calculated. That is to say, if the sensor 601 is faulty, the physical-quantity calculated value A1 indicates a defective condition, while the physical-quantity calculated values A2 and A3 indicate proper conditions to within a sensor and calculation tolerances. Accordingly, the ratios R12 and R13 are almost equal and deviate from 1 depending on the level of defectiveness indicated by the A1. In contrast, the ratio R23, which does not use the physical-quantity calculated value A1, is substantially 1, resulting in a significant difference between the ratios R12 and R23.

Therefore, the determination section 1410 can determine that the physical-quantity calculated value A1 indicates a defective condition, that is, that the sensor 601 is faulty.

The determination sections 1411 and 1412 can execute a determination process similar to that of the determination section 1410 on the basis of a principle similar to that of the determination section 1410 to determine that the physical-quantity calculated values A2 and A3 indicate defective conditions, that is, that the sensors 602 and 603, respectively, are faulty.

The determination method carried out by the determination sections 1410, 1411, and 1412 is effective on other processes. For example, the method may be based on the following: both rations R12 and R13 deviate from 1 and the ratio R23 is close to 1.

Moreover, instead of allowing the comparative calculation sections 1407, 1408, and 1409 to calculate the ratios, it is possible to calculate the difference between each set of two of the three calculated values and then to compare the resulting differences with one another to determine which of the calculated values indicates a defective condition, that is, which of the sensors is defective.

A specific calculation method may be appropriately selected on the basis of the nature of the target error, the performance of the calculation section, or the like, as previously described.

The above embodiment determines that one of the at least three sensors which deviates from the others is defective.

Figure 16:
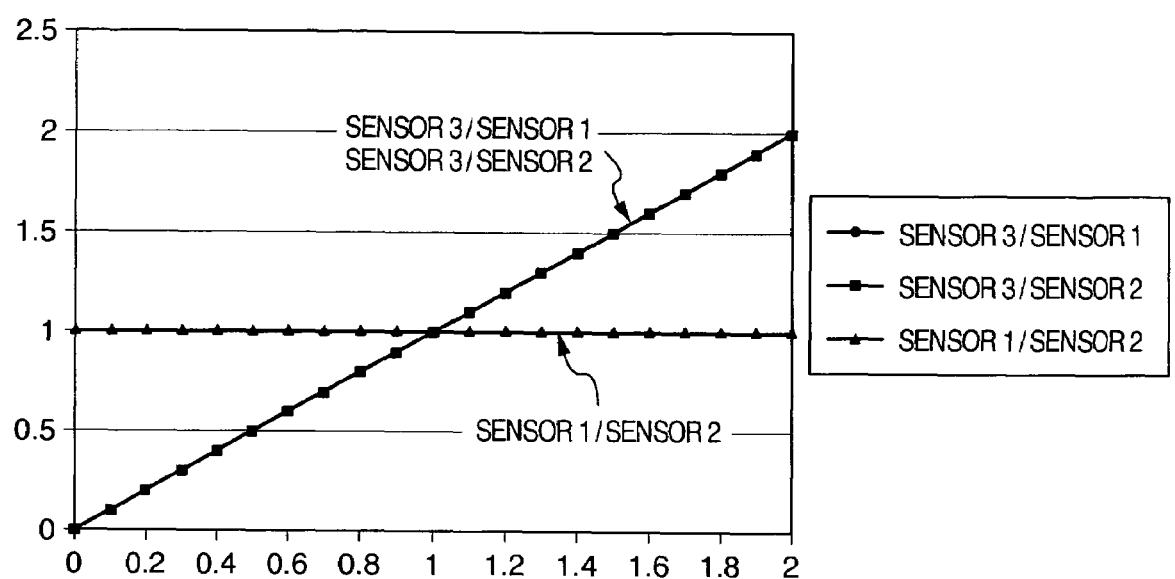
FIG. 16 is a graph showing a result of simulation of fault determination performance of the fault diagnosis apparatus for sensors according to another embodiment shown in FIG. 15.

With reference to FIG. 16, description will be given of simulation of fault determination performance of the present embodiment. In FIG. 16, the axis of abscissa indicates the calculated value of the physical quantity obtained by the sensor 3 when the calculated values of the physical quantities obtained by the sensors 1 and 2 (601 and 602) are always 1, indicating the proper condition, whereas the calculated value of the physical quantity obtained by the sensor 3 (603) varies from 0 to 2. The axis of ordinate indicates values, around 1, which correspond to indices obtained by dividing the calculated value of the physical quantity obtained by the sensor 1 by the calculated value of the physical quantity obtained by the sensor 2, dividing the calculated value of the physical quantity obtained by the sensor 3 by the calculated value of the physical quantity obtained by the sensor 1, and dividing the calculated value of the physical quantity obtained by the sensor 3 by the calculated value of the physical quantity obtained by the sensor 2.

The calculated value of the physical quantity obtained by the sensor 3 is not used for the index obtained by dividing the calculated value of the physical quantity obtained by the sensor 1 by the calculated value of the physical quantity obtained by the sensor 2. The index thus always exhibits a value of 1. However, the following indices deviate linearly from 1 depending on the calculated value of the physical quantity obtained by the sensor 3: indices obtained by dividing the calculated value of the physical quantity obtained by the sensor 3 by the calculated value of the physical quantity obtained by the sensor 1 and dividing the calculated value of the physical quantity obtained by the sensor 3 by the calculated value of the physical quantity obtained by the sensor 2.

It is therefore understood that the determination section 1412, shown in FIG. 15, can determine the sensor 603 to be faulty when the calculated value of the physical quantity obtained by the sensor 603 deviates from 1. In contrast, the determination sections 1410 and 1411 do not determine that the sensors 601 and 602 are faulty.

Alternatively, a defect can be determined to be occurring in the sensor for which at least two results indicate that it belongs to the set involving a difference of at least the predetermined value.

Figure 17:
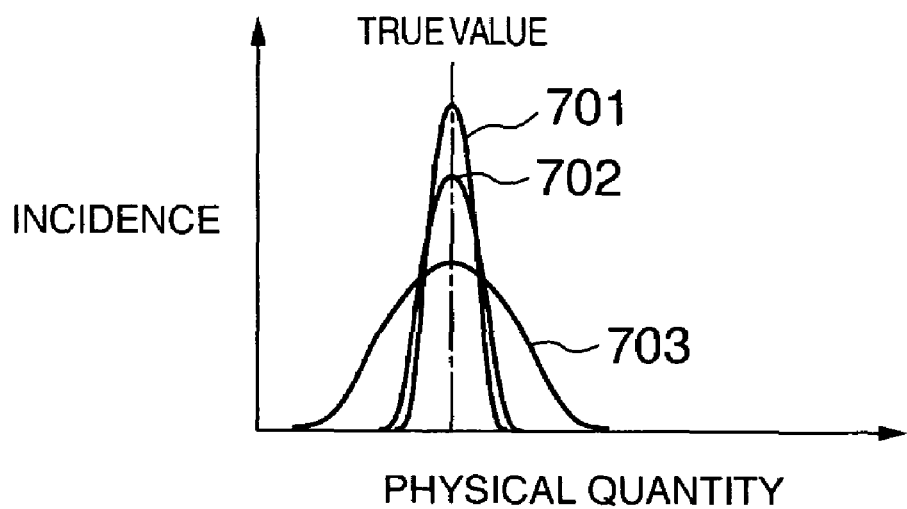
FIG. 17 is a graph showing the accuracy of calculated values of physical quantities.

Now, with reference to FIG. 17, description will be given of how to deal with the same physical quantity determined from each sensor measurement, that is, the physical quantity A shown in FIG. 12. In FIG. 17, the axis of abscissa indicates the same physical quantity, while the axis of ordinate indicates the incidence of the physical quantity determined from each sensor measurement under predetermined conditions. Characteristics 701, 702, and 703 denote the incidences of the physical quantity observed when the corresponding three sensors are in a proper condition.

The quantities of state detected by the sensors vary as previously described. Since the same physical quantity is calculated from the different quantities of state, a variation in the calculated value of the physical quantity varies.

This will be described taking the case of the cylinder intake air quantities Q obtained from the air flow sensor 103, intake pipe pressure sensor 128, and throttle sensor 104. The air flow sensor 103 directly measures the intake air quantity and is thus expected to accurately measure the cylinder intake air quantity Q. Owing to overlapping of calculation errors in the conversion of the intake pipe pressure P into the cylinder intake air quantity Q as described in FIG. 6 as well as individual variations, the accuracy with which the intake pipe pressure sensor 128 measures the cylinder intake air quantity Q varies more greatly than that with which the air flow sensor 103 measures the cylinder intake air quantity Q.

Owing to overlapping of nonlinear calculation errors in the conversion of the intake opening area S into the cylinder intake air quantity Q as described in FIG. 5 as well as individual variations, the accuracy with which the throttle sensor 124 measures the cylinder intake air quantity Q varies more greatly than that with which the intake pipe pressure sensor 128 measures the cylinder intake air quantity Q.

In FIG. 17, the characteristic 701 may correspond to the cylinder intake air quantity Q obtained by the air flow sensor 103. The characteristic 702 may correspond to the cylinder intake air quantity Q obtained by the intake pipe pressure sensor 128. The characteristic 703 may correspond to the cylinder intake air quantity Q obtained by the throttle sensor 104.

In such a case, first, a predetermined threshold for determining a defective condition is appropriately selected taking into account the accuracies of the group of sensors and system and the linearity of the indices, as previously described. Specifically, in the above example, a threshold for comparative determination used to determine whether or not the throttle sensor 104 is faulty is set to narrow the range of fault determination.

Figure 18:
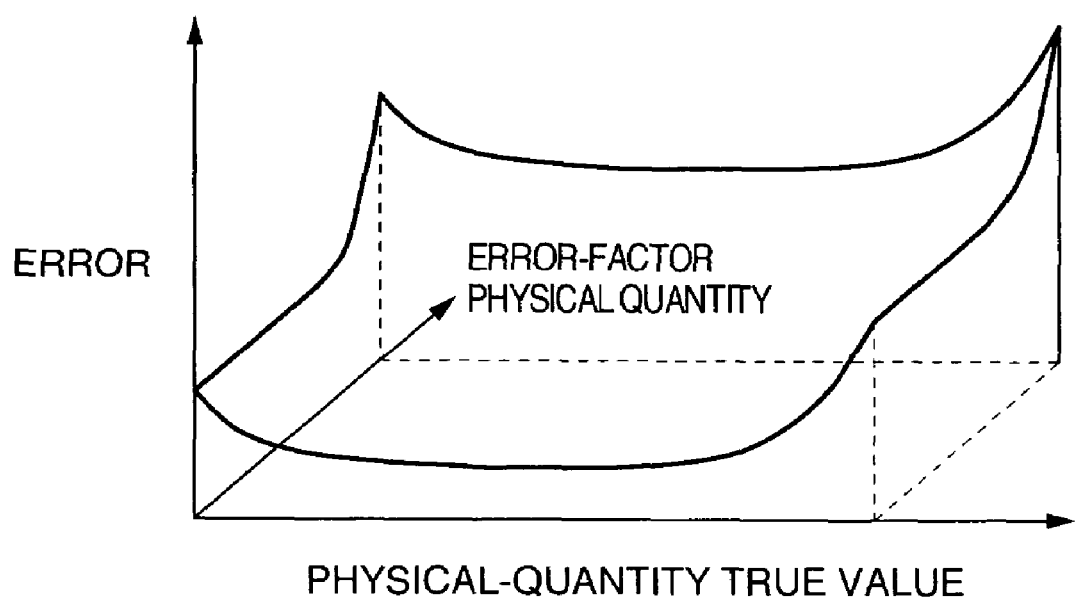
FIG. 18 is a graph showing the characteristics of the sensors.

The quantity of a variation in the calculated value of the physical quantity described with reference to FIG. 17 may vary depending on the condition of the system. FIG. 18 shows a three-dimensional characteristic corresponding to an example of a variation error appearance characteristic. The axis of abscissa indicates the true value of the physical quantity. The axis of ordinate indicates the physical quantity of an error factor. The vertical axis indicates the quantity of errors.

Sensors generally have ranges over which they can measure targets. Marked measurement errors occur in an upper and lower limit areas of each of these ranges. Consequently, as shown in FIG. 18, marked errors occur in areas with larger or smaller physical-quantity true values.

Further, the sensor measurement error depends on a factor affecting the sensor measurement accuracy, for example, the environmental temperature of the sensor. In the example in FIG. 18, a more significant error occurs when the factor has a larger value.

To deal with this, first, the determination threshold may be varied depending on the physical-quantity true value or error-factor physical quantity.

Specifically, the physical-quantity true value is the average value AAV in the embodiment shown in FIGS. 8 and 11, the physical-quantity calculated value A3 in the embodiment shown in FIG. 14, or the physical quantity obtained by the sensors other than the one to be determined, in the embodiment shown in FIG. 15.

However, even the above method may result in an error exceeding a predetermined value at which an intended fault determination can be made.

In this case, the fault determination is desirably avoided. Specifically, in such a case as shown in FIG. 18, fault determination is avoided if the value on the axis of abscissa in which an error of at least the predetermined value is expected to occur is equal to or larger than a predetermined value or equal to or smaller than a predetermined value, or if the error-factor physical quantity is equal to or larger than a predetermined value.

In the above embodiment, it is assumed that only one sensor is faulty as previously described. Accordingly, when a fault is detected in one of the sensors, the same method cannot be used to determine whether or not the two other sensors are faulty.

Therefore, when one of the sensors is determined to be faulty, fault determination for the other sensors is desirably avoided. In this case, if the sensor determined to be faulty returns to its proper condition, this condition is desirably detected. Accordingly, fault determination is desirably continuously executed on the sensor determined to be faulty.

As previously described, signals from sensors are often in the form of electric signals such as voltages when input to the calculation circuit for a calculation process. Thus, if a signal line through which electric signals are transmitted is defective, for example, if a signal line for signals via which voltages are input is open-circuited in any area, if the signal line is short-circuited in an area with a ground potential, or if the signal line is short-circuited in an area with a power supply potential, then the input voltage is close to 0 V or the upper limit.

The above condition can be easily detected by observing the input voltage value. This means that the range of the sensor output voltage is often specified so as to deviate from the input range in the proper condition.

Further, in this case, the above method enables the sensor to be determined to be faulty without the need to detect the fault. Thus, if a second predetermined value much larger than a given predetermined value is exceeded, the sensor is desirably immediately determined to be defective. In other words, if the output from the sensor exceeds a predetermined value larger than the predetermined value for fault determination, that sensor is determined to be defective in preference to the other fault determinations.

In the above description, signal inputs from the sensors are in voltage form. However, even if PWM or pulse signal count is used for inputs, fault determination can be made in the same manner as previously described. This is because with the PWM or pulse signal count, a high- or low-level input signal results from open-circuiting of the signal line or short-circuiting of an area with the ground potential or power supply potential.

Figure 19:
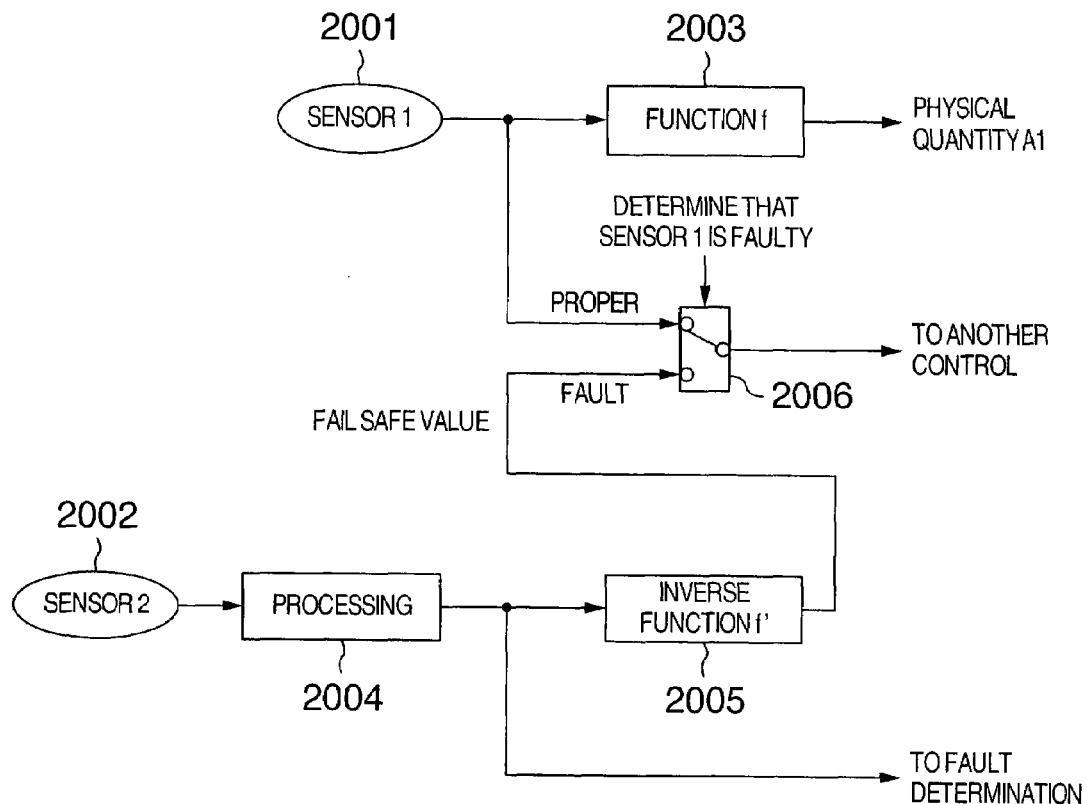
FIG. 19 is a control block diagram showing further another embodiment of the fault diagnosis apparatus for sensors according to the present invention.

With reference to FIG. 19, description will be given of an embodiment of a fail safe function for compensating for functions lost by a defect in the sensor.

Sensors 2001 and 2002 are equivalent to those previously described.

A conversion processing section 2003 calculates the same physical quantity like, for example, the conversion processing section 21 described with reference to FIG. 1. The conversion process is executed using a function f. The conversion processing section 2003 thus outputs the physical quantity A1.

Similarly, a conversion processing section 2004 calculates the same physical quantity like, for example, the conversion processing section 22 described with reference to FIG. 1. The conversion processing section 2004 thus outputs the physical quantity A2.

An output from the sensor 2001 is input to the above fault determination and used for applications other than the fault determination.

Specifically, in the above description, the conversion processing section 2003 outputs the cylinder intake air quantity Q on the basis of the output value from the intake pipe pressure sensor 128. Apart from this, the intake pipe pressure is used to determine the difference between fuel supply pressure and the pressure of an injection target, for example, when the fuel injection pulse width of the injector 112 is calculated.

In this case, if the sensor 2001 is faulty and an output value from the sensor is used as it is to calculate the fuel injection pulse width, the calculated injection pulse width deviates from the desired value because the output value from the sensor 2001 is different from the true value.

To prevent this, the present embodiment uses prohibition processing section 2006 which, when the sensor 2001 is faulty, causes a fail safe value to be output in place of the sensor output value.

The fail safe value is obtained by a calculation processing section 2005 by executing a function f' on the physical quantity A2, an output from the calculation processing section 2004; the function f' is inverse to the function f, used by the calculation processing section 2004.

Specifically, when the sensor 2002 is assumed to be the air flow sensor 103, the cylinder intake air quantity Q determined by the air flow sensor 103 can be used to estimate the intake pipe pressure P using information on the engine speed N, on the basis of the relationship described with reference to FIG. 6.

The function f determines the axis of ordinate from the axis of abscissa in FIG. 6. The inverse function f' determines the axis of abscissa from the axis of ordinate.

As described above, the processing described with reference to FIG. 19 enables the desirable control to be performed on the basis of the input from the sensor 2002 when the sensor 2001 is faulty.

In the above description of the specific example, the present invention is applied to the three sensors, the air flow sensor 103, intake pipe pressure sensor 128, and throttle sensor 104. However, the present invention is applicable in different manners provided that detection outputs from three or more sensors can be compared with one another. Another specific example can use a combination of any three of the air flow sensor 103, intake pipe pressure sensor 128, throttle sensor 104, and air/fuel ratio sensor 118.

Figure 4:
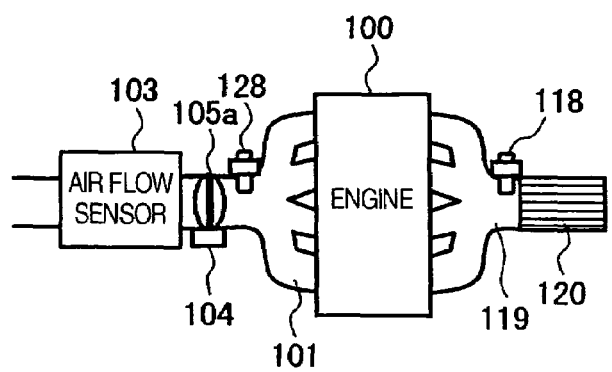
FIG. 4 is a diagram illustrating the arrangement of sensors in an engine system.

The air/fuel sensor 118 is installed on the exhaust pipe 119 as shown in FIG. 4. The air/fuel sensor 118 can detect the air/fuel ratio on the basis of the concentration of oxygen in an exhaust gas. For a gasoline engine, in general, the air/fuel ratio, that is, the weight ratio of air to the fuel, is controlled to a target value. The quantity of fuel injected by the injector 112 is controlled so that the air/fuel ratio has the target value.

This enables the intake air quantity Q to be determined from the quantity of fuel injected and the air/fuel ratio detected by the air/fuel sensor 118. Also in this case, the cylinder intake air quantity Q can be determined using the engine speed N.

The cylinder intake air quantity Q can be obtained from the air flow sensor 103, intake pipe pressure sensor 128, and throttle sensor 104 as previously described. The present invention is thus applicable to a combination of three of the air flow sensor 103, intake pipe pressure sensor 128, throttle sensor 128, and air/fuel sensor 118.

The air/fuel sensor 118 includes an $O_2$ sensor that indicates that the intake air is rich or lean on the basis of theoretical air/fuel ratio. The present invention is also applicable to a combination with the $O_2$ sensor as is the case with the air/fuel sensor.

Information can be obtained from the quantity of fuel injected and the information indicating whether the intake air detected by the $O_2$ sensor is rich or lean on the basis of the theoretical air/fuel ratio; the information obtained indicates that the intake air quantity is larger or smaller than a theoretical air/fuel ratio-equivalent value. This intake air quantity can be compared with intake air quantities calculated on the basis of the outputs from the other sensors.

If the air/fuel sensor including the $O_2$ sensor is disposed in front of and behind the catalyst 120, two pieces of exhaust air/fuel ratio information can be obtained. The present invention is thus applicable to two air/fuel sensors.

A control system for vehicles such as automobiles is provided with various temperature sensors such as a water temperature sensor that detects the temperature of cooling water for the engine, an intake temperature sensor that detects the temperature of intake air, an interior temperature sensor that detects interior temperature for vehicle air conditioning, an exterior temperature sensor that detects ambient temperature, an oil temperature sensor that detects the temperature of transmission oil, and a fuel temperature sensor that detects the temperature of a fuel.

In this case, the fault diagnosis apparatus according to the present invention is also applicable provided that the same temperature can be estimated on the basis of detected values from at least three temperature sensors.

In an easily understandable example, when the whole vehicle including the air is in a temperature balanced state, the temperature sensors should show a terminal temperature if they are in a proper condition. This phenomenon can be utilized to determine whether or not the target sensor is faulty, using the fault diagnosis apparatus according to the present invention.

The control system for vehicles such as automobiles is also provided with pressure sensors that detect various pressures, such as the previously described intake pipe pressure sensor, an atmospheric pressure sensor that detects atmospheric pressure, a tank pressure sensor that detects the pressure in a fuel tank, and a fuel pressure sensor that detects the pressure in a fuel feed line.

Accordingly, as is the case with the above temperature sensors, the fault diagnosis apparatus according to the present invention is also applicable provided that the same pressure can be estimated on the basis of detected values from at least three pressure sensors.

The above description is intended for gasoline engine vehicles. However, the fault diagnosis apparatus according to the present invention is applicable to diesel engine vehicles.

The fault diagnosis apparatus according to the present invention is also applicable to vehicle driven by electric motors.

The present invention is also applicable to a group of sensors that can directly or indirectly detect an output from an electric motor as the same physical quantity, for example, a combination of a motor current detection section, a vehicle acceleration detection section, a motor heating value detection section, a motor torque detection section, and the like.

Now, description will be given of a check method executed by the fault diagnosis apparatus according to the present invention which is applied to a vehicle.

For preparation, at least three target sensors are selected. Electric signal input device is interposed into electric signal lines through which outputs from the sensors are input to a calculation device such as the control unit 115; dummy signals can be input to the electric signal input devices, which can switch input values to outputs from the sensors.

Outputs from the sensors are input to the fault diagnosis apparatus via the electric signal input device. The vehicle is started and brought into an operation condition under which fault determination is made. At this time, a vehicle fault determination display section or the like is used to confirm that fault determination has not been made.

Then, first, an input to the control unit is switched to a dummy signal for a fault condition. The vehicle fault determination display section or the like is used to confirm that the sensor is determined to be faulty.

After the confirmation, the dummy signal is replaced with the signal from the sensor by the electric signal input device and an appropriate operation is performed. Confirmation is made that the fault determination has been cancelled.

Second, the vehicle is started and brought into the operation condition under which fault determination is made. Then, the output signals from two sensors are simultaneously switched to dummy signals by the electric signal input device switches such that detected values from the two sensors are matched as different operation conditions and are significantly different from actual operation conditions. The vehicle fault determination display section or the like is then used to confirm that the remaining sensor is determined to be faulty. After the confirmation, the previously described two inputs are switched back to the inputs from the sensors and an appropriate operation is performed. Confirmation is made that the fault determination has been cancelled.

Third, the vehicle is started and brought into the operation condition under which fault determination is made. The output signal from the electric signal input device which the dummy signal was not input in the second procedure is switched to a dummy signal for a faulty condition. The vehicle fault determination display section or the like is then used to confirm that this sensor is determined to be faulty.

In the above procedure, fault determination is not made by a comparison of two sensors but by comparing detection outputs from at least three sensors and determining one of the sensors to be defective when the output from this sensor is different from those from the other sensors by at least a given determined value.

In the above description, three sensors are subjected to fault determination. However, it is easily understood that the fault diagnosis apparatus according to the present invention is applicable to four or more target sensors in view of the previously described principle. Further throughout the specification and claims, the term "sensor" means a sensor element itself and a sensor element having the signal line at the output thereof.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A fault diagnosis apparatus for sensors in an apparatus system having at least three sensors which detect different physical quantities for a physical phenomenon which vary in correlation with one another, the sensors outputting signals indicating the detected physical quantities, the apparatus comprising:
   comparison means for comparing outputs from each set of two of the at least three sensors with each other; and
   determination means for determining whether or not a difference in output between the two sensors of each set has at least a predetermined value, the set being a result of mutual comparison by the comparison means, and comparing a set involving a difference of at least the predetermined value with a set not involving a difference of at least the predetermined value to determine that one of the sensors is defective.

2. The fault diagnosis apparatus for sensors according to claim 1, wherein the determination means determines that a defect is occurring in one of the sensors belonging to the set involving a difference of at least the predetermined value which sensor provides an output deviating from the outputs from the other sensors.

3. The fault diagnosis apparatus for sensors according to claim 1, wherein the determination means 1208 determines that two sensors that do not belong to the set not involving a difference of at least the predetermined value are in a proper condition.

4. The fault diagnosis apparatus for sensors according to claim 1, wherein the determination means determines that a defect is occurring in one of the sensors for which the apparatus determines at least twice that the sensor belongs to the set involving a difference of at least the predetermined value.

5. The fault diagnosis apparatus for sensors according to claim 1, wherein if an output from any of the sensors exceeds a predetermined value larger than a predetermined value for fault determination, this sensor is determined to be defective in preference to other fault determinations.

6. A vehicle comprising the fault diagnosis apparatus for sensors in an apparatus system having at least three sensors which detect different physical quantities for a physical phenomenon which vary in correlation with one another, the sensors outputting signals indicating the detected physical quantities, the apparatus comprising:
   comparison means for comparing outputs from each set of two of the at least three sensors with each other; and
   determination means for determining whether or not a difference in output between the two sensors of each set has at least a predetermined value, the set being a result of mutual comparison by the comparison means, and comparing a set involving a difference of at least the predetermined value with a set not involving a difference of at least the predetermined value to determine that one of the sensors is defective.

7. A control apparatus for internal combustion engines, the apparatus comprising the fault diagnosis apparatus for sensors in an apparatus system having at least three sensors which detect different physical quantities for a physical phenomenon which vary in correlation with one another, the sensors outputting signals indicating the detected physical quantities, the apparatus comprising:
   comparison means for comparing outputs from each set of two of the at least three sensors with each other; and
   determination means for determining whether or not a difference in output between the two sensors of each set has at least a predetermined value, the set being a result of mutual comparison by the comparison means, and comparing a set involving a difference of at least the predetermined value with a set not involving a difference of at least the predetermined value to determine that one of the sensors is defective.

8. The fault diagnosis apparatus for sensors according to claim 1, wherein if an output from any of the sensors exceeds a predetermined value larger than a predetermined value for fault determination, this sensor is determined to be defective in preference to other fault determinations.

* * * * *